US012341710B2

(12) United States Patent
Chang et al.

(10) Patent No.: US 12,341,710 B2
(45) Date of Patent: Jun. 24, 2025

(54) PACKET FORWARDING APPARATUS WITH BUFFER RECYCLING AND ASSOCIATED PACKET FORWARDING METHOD

(71) Applicant: MEDIATEK INC., Hsin-Chu (TW)

(72) Inventors: Ching-Liang Chang, Hsinchu (TW); Wei-Lun Liu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 437 days.

(21) Appl. No.: 17/872,030

(22) Filed: Jul. 25, 2022

(65) Prior Publication Data
US 2023/0179545 A1 Jun. 8, 2023

Related U.S. Application Data

(60) Provisional application No. 63/286,586, filed on Dec. 7, 2021.

(51) Int. Cl.
| G06F 13/36 | (2006.01) |
| G06F 9/50 | (2006.01) |
| G06F 13/16 | (2006.01) |
| H04L 49/90 | (2022.01) |
| G06F 13/28 | (2006.01) |
| G06F 13/42 | (2006.01) |

(52) U.S. Cl.
CPC ........ *H04L 49/9026* (2013.01); *G06F 9/5016* (2013.01); *G06F 13/1673* (2013.01); *G06F 13/28* (2013.01); *G06F 13/42* (2013.01); *G06F 2213/2806* (2013.01)

(58) Field of Classification Search
CPC ... H04L 49/9026; H04L 49/90; H04L 49/901; H04L 47/76; H04L 47/72; G06F 9/5016; G06F 13/1673; G06F 13/28; G06F 13/42; G06F 2213/2806
See application file for complete search history.

(56) References Cited

U.S. PATENT DOCUMENTS

| 8,572,353 | B1 | 10/2013 | Bratt | |
| 2007/0115982 | A1* | 5/2007 | Pope | ....................... H04L 49/90 |
| | | | | 370/392 |
| 2007/0183418 | A1* | 8/2007 | Riddoch | ................. H04L 12/18 |
| | | | | 370/389 |
| 2016/0320967 | A1 | 11/2016 | Kostic | |
| 2017/0249079 | A1* | 8/2017 | Mutha | ................... H04L 49/901 |
| 2020/0259759 | A1 | 8/2020 | Shalev | |
| 2021/0117360 | A1 | 4/2021 | Kutch | |

FOREIGN PATENT DOCUMENTS

CN 113127390 A 7/2021

* cited by examiner

Primary Examiner — Henry Tsai
Assistant Examiner — Kim T Huynh
(74) Attorney, Agent, or Firm — Winston Hsu

(57) ABSTRACT

A packet forwarding apparatus includes a first storage device and a processor. The first storage device has a plurality of buffers allocated therein, and at least one buffer included in the plurality of buffers is arranged to buffer at least one packet. The processor is arranged to execute a Linux kernel to perform software-based packet forwarding associated with the at least one packet. The at least one buffer allocated in the first storage device is recycled through direct memory access (DMA) management, and is reused for buffering at least one other packet.

20 Claims, 16 Drawing Sheets

PACKET FORWARDING APPARATUS WITH BUFFER RECYCLING AND ASSOCIATED PACKET FORWARDING METHOD

CROSS REFERENCE TO RELATED APPLICATIONS

This application claims the benefit of U.S. Provisional Application No. 63/286,586, filed on Dec. 7, 2021. The content of the application is incorporated herein by reference.

BACKGROUND

The present invention relates to packet forwarding, and more particularly, to a packet forwarding apparatus with buffer recycling and an associated packet forwarding method.

In data transmission, throughput (T-put) is the amount of data moved successfully from one device to another device in a given time period, and is typically measured in bits per second (bps), as in megabits per second (Mbps) or gigabits per second (Gbps). In general, T-put is a key point for a router product. The router product may employ a Linux operating system for dealing with the packet forwarding task. The socket buffer, or "SKB", is the most fundamental data structure in the Linux networking code. Every packet sent or received is handled using this data structure. In a typical router design, the Linux kernel is responsible for doing SKB allocation and SKB free during packet forwarding of packet(s), which consumes a lot of central processing unit (CPU) resources and may be a bottleneck of the T-put. Thus, there is a need for an innovative packet forwarding design which can improve the T-put performance.

SUMMARY

One of the objectives of the claimed invention is to provide a packet forwarding apparatus with buffer recycling and an associated packet forwarding method.

According to a first aspect of the present invention, an exemplary packet forwarding apparatus is disclosed. The exemplary packet forwarding apparatus includes a first storage device and a processor. The first storage device has a plurality of buffers allocated therein, and at least one buffer included in the plurality of buffers is arranged to buffer at least one packet. The processor is arranged to execute a Linux kernel to perform software-based packet forwarding associated with the at least one packet. The at least one buffer allocated in the first storage device is recycled through direct memory access (DMA) management, and reused for buffering at least one other packet.

According to a second aspect of the present invention, an exemplary packet forwarding method is disclosed. The exemplary packet forwarding method includes: buffering at least one packet in at least one buffer allocated in a storage device; executing a Linux kernel on a processor to perform software-based packet forwarding associated with the at least one packet; and recycling the at least one buffer allocated in the storage device through direct memory access (DMA) management, and reusing the at least one buffer for buffering at least one other packet.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names.

This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
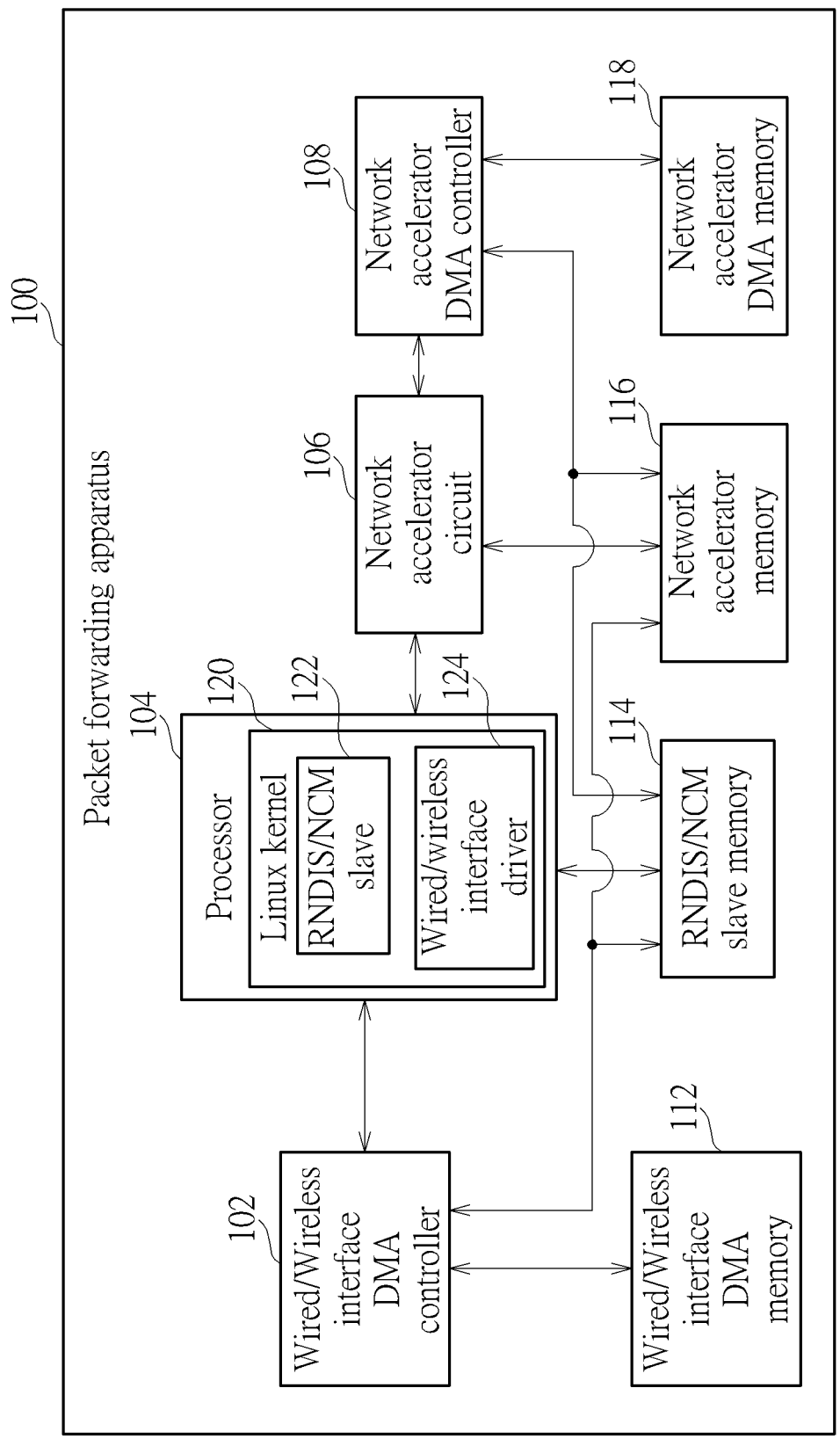
FIG. 1 is a diagram illustrating a packet forwarding apparatus with buffer recycling according to an embodiment of the present invention.

FIG. 1 is a diagram illustrating a packet forwarding apparatus with buffer recycling according to an embodiment of the present invention. By way of example, but not limitation, the packet forwarding apparatus 100 may be a router or any network device with packet forwarding functionality. In this embodiment, the packet forwarding apparatus 100 may include a wired/wireless interface direct memory access (DMA) controller 102, a processor 104, a network accelerator circuit 106, a network accelerator DMA controller 108, and a plurality of storage devices, including a wired/wireless interface DMA memory 112, a remote network driver interface specification (RNDIS)/network control model (NCM) slave memory 114, a network accelerator memory 116, and a network accelerator DMA memory 118. The processor 104 may be a central processing unit (CPU) or a microprocessor, and is arranged to load and execute a Linux kernel 120 for dealing with software-based packet forwarding. For example, the Linux kernel 120 may support an RNDIS/NCM slave module (labeled by "RNDIS/NCM slave") 122 and a wired/wireless interface driver 124. The network accelerator circuit 106 is arranged to deal with hardware-based packet forwarding. Specifically, a part of one packet forwarding task can be offloaded from the processor 104 (particularly, Linux kernel 120 running on the processor 104) to the specific hardware (i.e. network accelerator circuit 106) for reducing the load of the processor 104. That is, the network accelerator circuit 106 acts as an offload engine that provides hardware acceleration for a packet forwarding process in the Linux kernel 120. The wired/wireless interface DMA memory 112 is accessible to the wired/wireless interface DMA controller 102. The network accelerator DMA memory 118 is accessible to the network accelerator DMA controller 108. The RNDIS/NCM slave memory 114 is accessible to the processor 104 (particularly, Linux kernel 120 running on the processor 104). The network accelerator memory 116 is accessible to the network accelerator circuit 106. Furthermore, the wired/wireless interface DMA controller 102 can access RNDIS/NCM slave memory 114 and network accelerator memory 116 without intervention of the processor 104, and the network accelerator DMA controller 108 can access RNDIS/NCM slave memory 114 and network accelerator memory 116 without intervention of the processor 104. In this embodiment, the wired/wireless interface DMA controller 102, the network accelerator 106, and the network accelerator DMA controller 108 may be implemented by pure hardware, and the Linux kernel 120 is a software module that can achieve its intended functions after being loaded and executed by the processor 104.

One or more packets may be buffered in one or more buffers allocated in the RNDIS/NCM slave memory 114/network accelerator memory 116. When specific packet(s) buffered in specific buffer(s) are sent out by the packet forwarding apparatus 100, the specific buffer(s) already allocated in the RNDIS/NCM slave memory 114/network accelerator memory 116 can be recycled through DMA management, and can be reused for buffering other packet(s) later. In this way, the Linux kernel 120 running on the processor 104 does not need to allocate new buffer(s) in the RNDIS/NCM slave memory 114/network accelerator memory 116 during packet forwarding of the specific packet(s), and does not need to free the specific buffer(s) in the RNDIS/NCM slave memory 114/network accelerator memory 116 during packet forwarding of the specific packet(s). To put it simply, The packet forwarding apparatus 100 performs packet forwarding by jointly using hardware-based packet forwarding (which is achieved by network acceleration hardware) and software-based packet forwarding (which is achieved by Linux kernel networking), and employs the proposed buffer recycling scheme to have improved T-put performance and/or lower processor utilization. Further details of the proposed buffer recycling scheme employed by the packet forwarding apparatus 100 are described with reference to the accompanying drawings.

It should be noted that only the components pertinent to the present invention are shown in FIG. 1. In practice, some components may be added to the packet forwarding apparatus 100 or may be omitted from the packet forwarding apparatus 100, depending upon actual design considerations. To put it simply, any packet forwarding task that involves a packet forwarding process in the Linux kernel and the proposed buffer recycling design falls within the scope of the present invention.

For brevity and simplicity, the following assumes that an RNDIS protocol is involved in the packet forwarding. For example, the RNDIS/NCM slave module 122 may be regarded as an RNDIS slave module, and the RNDIS/NCM slave memory 114 may be regarded as an RNDIS slave memory. However, this is for illustrative purposes only, and is not meant to be a limitation of the present invention. In practice, any USB protocol may be employed by the proposed packet forwarding apparatus with buffer recycling. For example, an NCM protocol may be involved in the packet forwarding. In this case, the RNDIS/NCM slave module 122 may be regarded as an NCM slave module, and the RNDIS/NCM slave memory 114 may be regarded as an NCM slave memory. To put it simply, the present invention has no limitations on the USB protocol. Hence, the terms "RNDIS" and "NCM" may be interchangeable in the following description.

Figure 2:
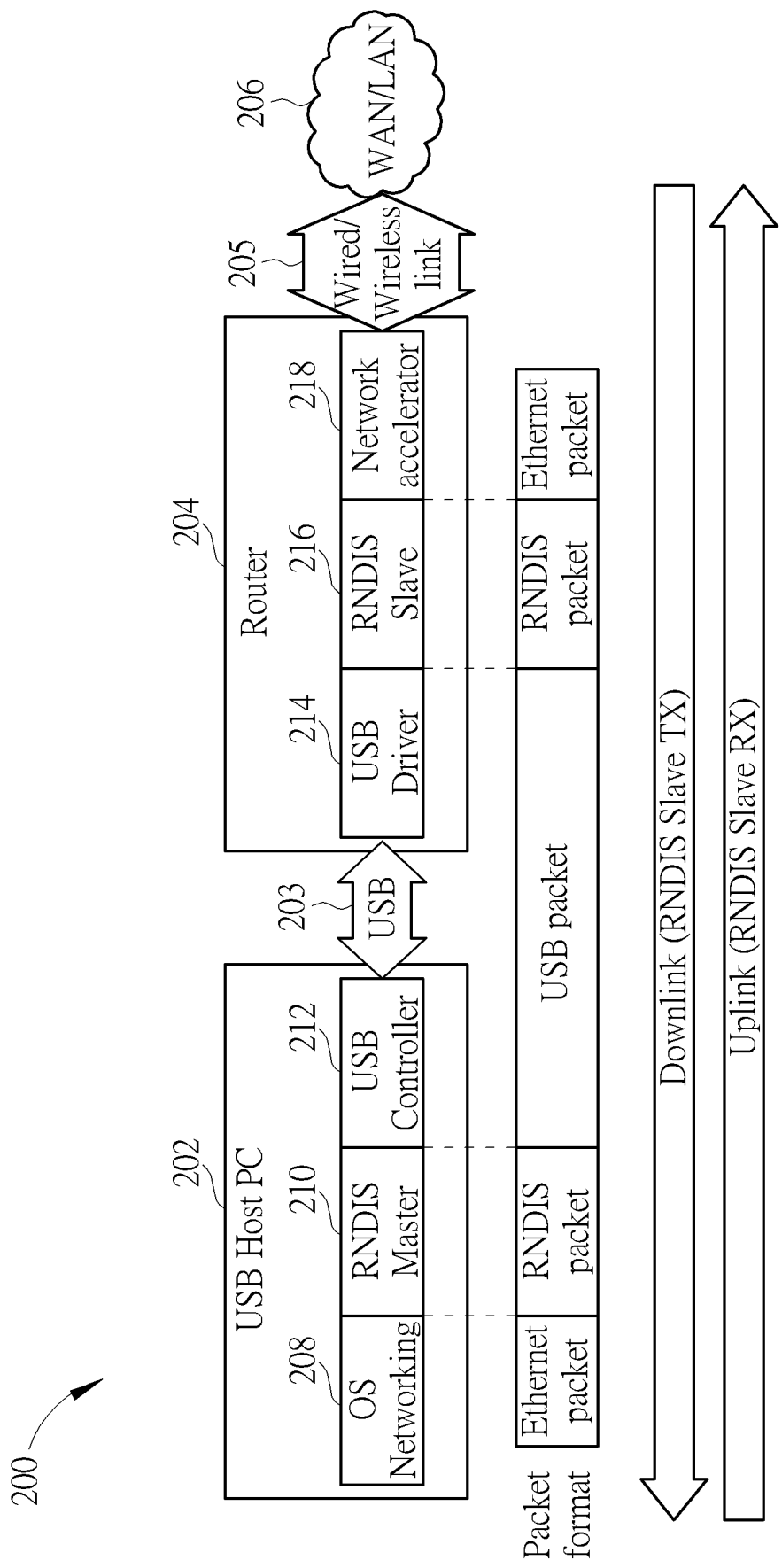
FIG. 2 is a diagram illustrating a network system according to an embodiment of the present invention.

FIG. 2 is a diagram illustrating a network system according to an embodiment of the present invention. The network system 200 may have a plurality of network devices, including a host personal computer (PC) and a packet forwarding apparatus. In this embodiment, the host PC may be a universal serial bus (USB) host PC 202, and the packet forwarding apparatus may be a router 204. The USB host PC 202 communicates with the router 204 through USB 203, and the router 204 communicates with a wide area network (WAN)/local area network (LAN) 206 through a wired/wireless link 205. For example, the wired/wireless link 205 may be realized by Wi-Fi, Ethernet, or modem (MD). The USB host PC 202 may have a processor (not shown) used to deal with an operating system (OS) networking module (labeled by "OS networking") 208 and an RNDIS master module (labeled by "RNDIS master") 210, and may have a USB controller 212 that is a hardware circuit used to deal with USB packet transmission and reception. The router 204 may have a processor (not shown) used to deal with a USB driver 214 and an RNDIS slave module (labeled by "RNDIS slave") 216, and may have a network accelerator circuit (labeled by "network accelerator") 218 that is a hardware circuit used to deal with Ethernet packet transmission and reception. The router 204 may be implemented by the packet forwarding apparatus 100 shown in FIG. 1, where the wired/wireless interface driver 124 of the Linux kernel 120 may be implemented by the USB driver 214, the RNDIS/NCM slave module 122 of the Linux kernel 120 may be implemented by the RNDIS slave module 216, and the network accelerator circuit 108 may be implemented by the network accelerator circuit 218.

All of the network devices are able to communicate with each other because they all use the same series of protocol layers. When a source network device wants to send a packet to a destination network device, the packet must go down through the series of protocol layers on the source network device. When the packet reaches the destination network device, the packet must go up through the same series of protocol layers. When the packet is forwarded through a router between the source network device and the destination network device, the packet goes through certain protocol layers on the router.

Figure 3:
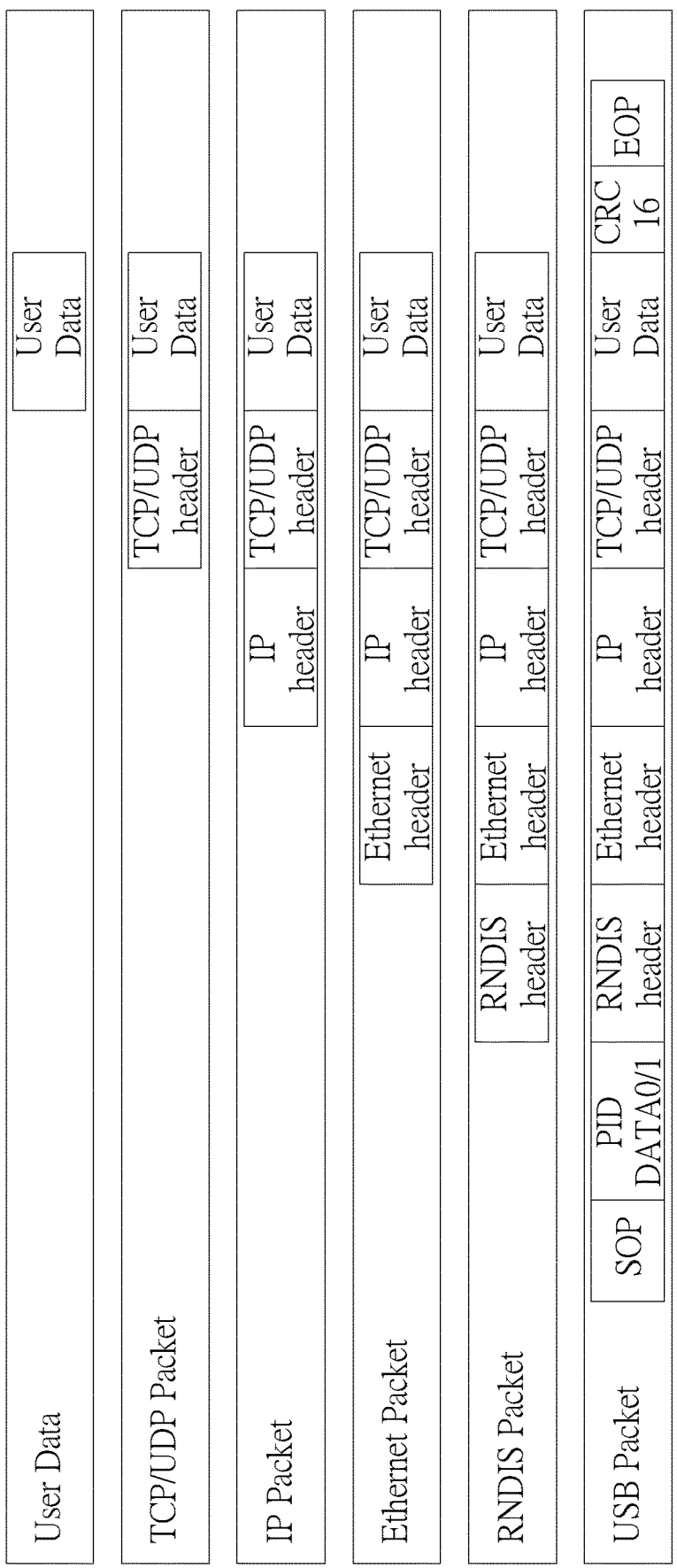
FIG. 3 is a diagram illustrating a USB/RNDIS protocol stack according to an embodiment of the present invention.

FIG. 3 is a diagram illustrating a USB/RNDIS protocol stack according to an embodiment of the present invention. When a packet moves down through the protocol layers, one of the transformations that the packet undergoes is called encapsulation. Encapsulation means that the original packet is encapsulated or wrapped by a header (and for some protocol layers, a trailer), resulting in a larger packet. Each protocol layer performs encapsulation to add the information specific to that layer to the packet. Similarly, when the packet goes up through the protocols, these headers are removed in a process called de-encapsulation. Because the packet is modified at each protocol layer, the packet has a different name at each protocol layer. As shown in FIG. 2, an encapsulation process is performed upon a packet consisting of user data (or called message) to add a TCP (Transmission Control Protocol)/UDP (User Datagram Protocol) header to the user data, thus resulting in a TCP/UDP packet; an encapsulation process is performed upon the TCP/IP packet to add an IP (Internet Protocol) header to the TCP/UDP packet, thus resulting in an IP packet; an encapsulation process is performed upon the IP packet to add an Ethernet header to the IP packet, thus resulting in an Ethernet packet; an encapsulation process is performed upon the Ethernet packet to add an RNDIS header to the Ethernet packet, thus resulting in an RNDIS packet; and an encapsulation process is performed upon the RNDIS packet to add SOP (Start of Packet), Packet Identifier (PID) DATA0/DATA1, 16-bit Cyclic Redundancy Check (CRC16) data, and EOP (End of Packet).

Furthermore, a de-encapsulation process is performed upon the USB packet to remove SOP, PID DATA0/DATA1, CRC16 data, and EOP, thus resulting in the RNDIS packet; a de-encapsulation process is performed upon the RNDIS packet to remove the RNDIS header, thus resulting in the Ethernet packet; a de-encapsulation process is performed upon the Ethernet packet to remove the Ethernet header, thus resulting in the IP packet; a de-encapsulation process is performed upon the IP packet to remove the IP header, thus resulting in the TCP/UDP packet; and a de-encapsulation process is performed upon the TCP/UDP packet to remove the TCP/UDP header, thus resulting in the packet consisting of the user data (or called message).

It should be noted that these packets with different names at different protocol layers of the USB/RNDIS protocol stack may be regarded as the same packet that carries the same user data but has different packet formats when passing through different protocol layers.

As shown in FIG. 2, regarding a downlink transmission from a remote network device (not shown) to the USB host PC 202 through the router 204, the RNDIS slave module 216 of the router 204 operates in a transmit (TX) mode for transmitting an RNDIS packet to be forwarded to the USB host PC 202, where the RNDIS packet is derived from an Ethernet packet received by the network accelerator circuit 218, and a USB packet is derived from the RNDIS packet for transmission over the USB 203. Regarding an uplink transmission from the USB host PC 202 to a remote network device (not shown) through the router 204, the RNDIS slave module 216 of the router 204 operates in a receive (RX) mode for receiving an RNDIS packet to be forwarded to the remote network device, where the RNDIS packet is derived from a USB packet transmitted over the USB 203, and an Ethernet packet derived from the RNDIS packet is sent out by the network accelerator circuit 218.

Figure 4:
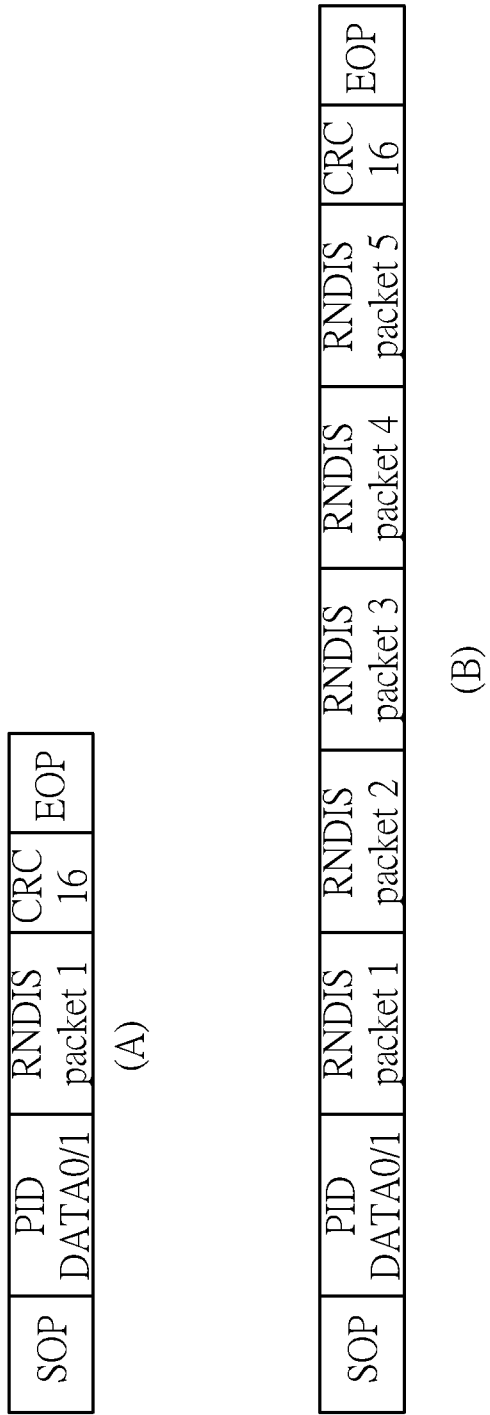
FIG. 4 is a diagram illustrating a USB packet transmitted without RNDIS packet aggregation and a USB packet transmitted with RNDIS packet aggregation.

It is possible that RNDIS packet aggregation may be supported and enabled by both of the USB host PC 202 and the router 204. FIG. 4 is a diagram illustrating a USB packet transmitted without RNDIS packet aggregation and a USB packet transmitted with RNDIS packet aggregation. As shown in sub-diagram (A) of FIG. 4, a USB packet is transmitted without RNDIS packet aggregation, such that only a single RNDIS packet (labeled by "RNDIS packet 1") is contained in one USB packet. As shown in sub-diagram (B) of FIG. 4, a USB packet is transmitted with RNDIS packet aggregation, such that multiple RNDIS packets (e.g., five RNDIS packets labeled by "RNDIS packet 1", "RNDIS packet 2", "RNDIS packet 3", "RNDIS packet 4", and "RNDIS packet 5") are contained in one USB packet. The purpose of RNDIS packet aggregation is to increase the USB transfer rate for T-put improvement.

It should be noted that the network system 200 shown in FIG. 2 is for illustrative purposes only, and is not meant to be a limitation of the present invention. For example, the USB 203 between the USB host PC 202 and the router 204 may be replaced with Wi-Fi, Ethernet, or any suitable wired/wireless link. For better comprehension of technical features of the present invention, the following assumes that the wired/wireless interface DMA controller 102 shown in FIG. 1 is a USB DMA controller, and the wired/wireless interface DMA memory 112 is a USB DMA memory. In practice, the wired/wireless interface DMA controller 102 shown in FIG. 1 is not limited to a USB DMA controller, and the wired/wireless interface DMA memory 112 is not limited to a USB DMA memory.

Since the router 204 may be implemented using the packet forwarding apparatus 100 shown in FIG. 1, the router 204 can benefit from the proposed buffer recycling scheme to improve its T-put performance. Furthermore, the proposed buffer recycling scheme can operate under one case where RNDIS packet aggregation is supported and enabled and another case where RNDIS packet aggregation is not supported or is supported but not enabled.

Figure 5:
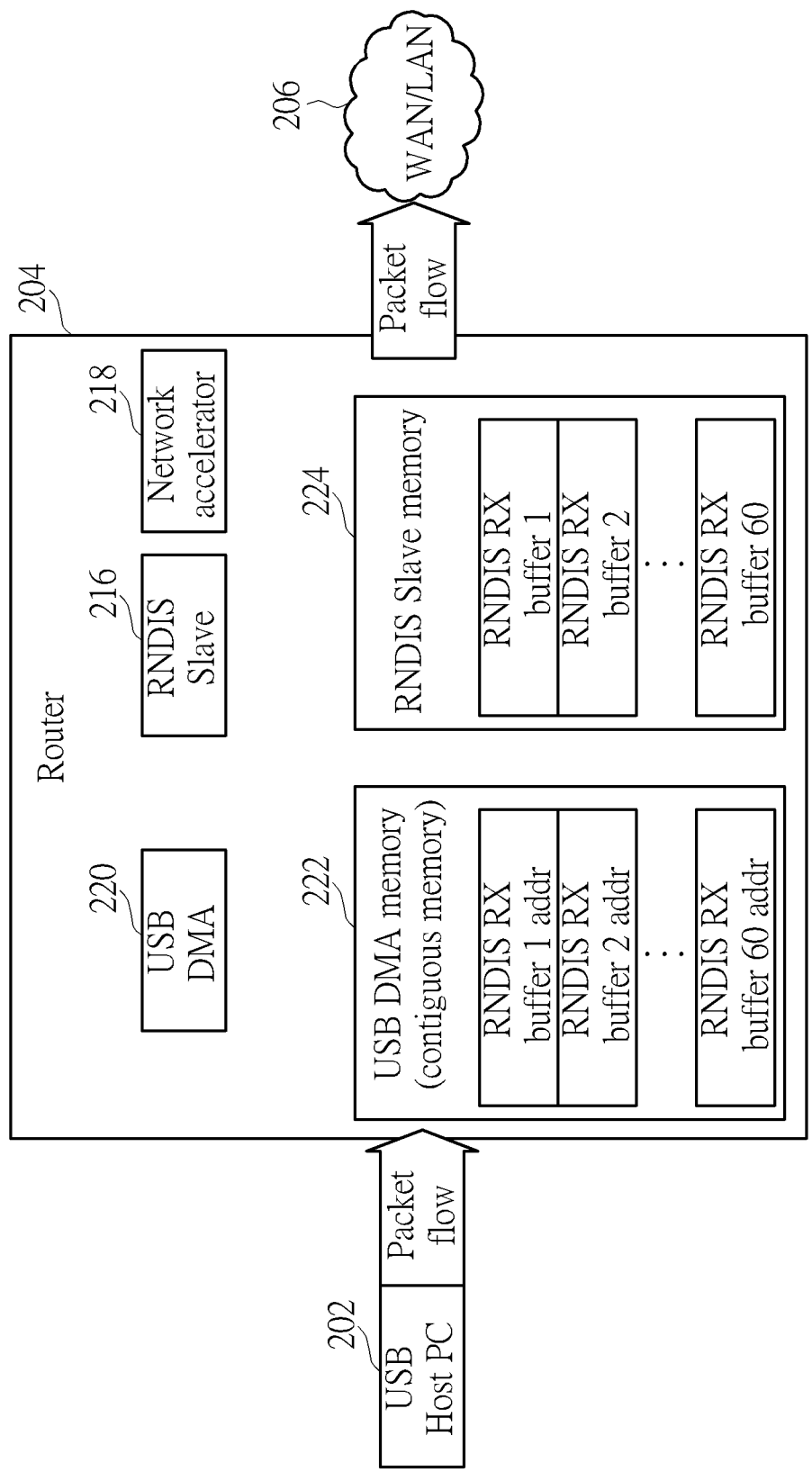
FIG. 5 is a diagram illustrating a configuration of a router having an RNDIS slave module that operates in an RX mode for uplink packet forwarding with/without aggregation according to an embodiment of the present invention.

FIG. 5 is a diagram illustrating a configuration of the router 204 having the RNDIS slave module 216 that operates in an RX mode for uplink packet forwarding with/without aggregation according to an embodiment of the present invention. The router 204 may be implemented using the packet forwarding apparatus 100 shown in FIG. 1, where the wired/wireless interface DMA controller 102 is implemented by the USB DMA controller (labeled by "USB DMA") 220, the RNDIS/NCM slave module 122 of the Linux kernel 120 is implemented by the RNDIS slave module (labeled by "RNDIS slave") 216, the network accelerator circuit 106 is implemented by the network accelerator circuit (labeled by "network accelerator") 218, the wired/wireless interface DMA memory 112 is implemented by the USB DMA memory 222, and the RNDIS/NCM slave memory 114 is implemented by the RNDIS slave memory 224. The RNDIS slave memory 224 may have a plurality of RNDIS RX buffers (e.g., "RNDIS RX buffer 1" to "RNDIS RX buffer 60") allocated therein. The USB DMA memory 222 is a contiguous memory for storing addresses at which the RNDIS RX buffers are allocated in the RNDIS slave memory 224. As shown in FIG. 5, the RNDIS RX buffer addresses (e.g., "RNDIS RX buffer 1 addr" to "RNDIS RX buffer 60 addr") are stored in contiguous addresses of the USB DMA memory 222. For example, the USB DMA memory 222 may operate like a circular queue.

Figure 6:
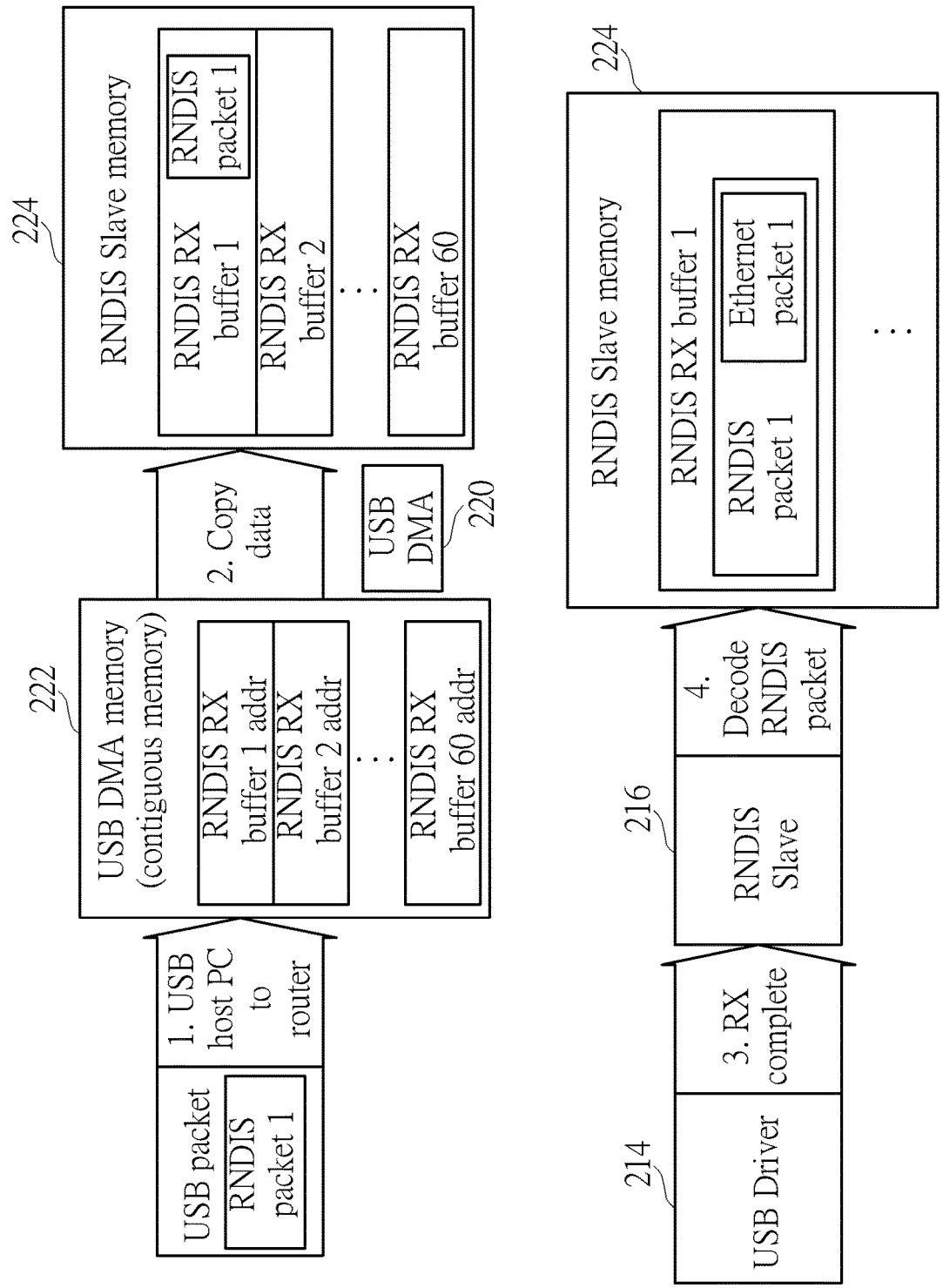
FIG. 6 is a diagram illustrating a first part of an uplink packet forwarding task performed on the router for forwarding a packet without aggregation according to an embodiment of the present invention.

Please refer to FIG. 6 in conjunction with FIG. 5. FIG. 6 is a diagram illustrating a first part of an uplink packet forwarding task performed on the router 204 for forwarding a packet without aggregation according to an embodiment of the present invention. As shown in FIG. 6, one USB packet (which contains only a single RNDIS packet "RNDIS packet 1") is transmitted from the USB host PC 202 and received by the router 204. An RNDIS RX buffer address (e.g., "RNDIS RX buffer 1 addr") is dequeued from the USB DMA memory 222, and the USB DMA controller 220 refers to the RNDIS RX buffer address "RNDIS RX buffer 1 addr" for copying data of the RNDIS packet "RNDIS packet 1" to the RNDIS RX buffer "RNDIS RX buffer 1" allocated at the RNDIS RX buffer address "RNDIS RX buffer 1 addr" in the RNDIS slave memory 224. After data of the RNDIS packet "RNDIS packet 1" are successfully stored into the RNDIS RX buffer "RNDIS RX buffer 1", the USB driver 214 informs the RNDIS slave module 216 of "RX complete" notification. Next, the RNDIS slave module 216 decodes (or de-encapsulates) the RNDIS packet "RNDIS packet 1" for obtaining an Ethernet packet "Ethernet packet 1" contained in the RNDIS packet "RNDIS packet 1". For example, the Ethernet packet "Ethernet packet 1" may be obtained by removing an RNDIS header from the RNDIS packet "RNDIS packet 1".

Figure 7:
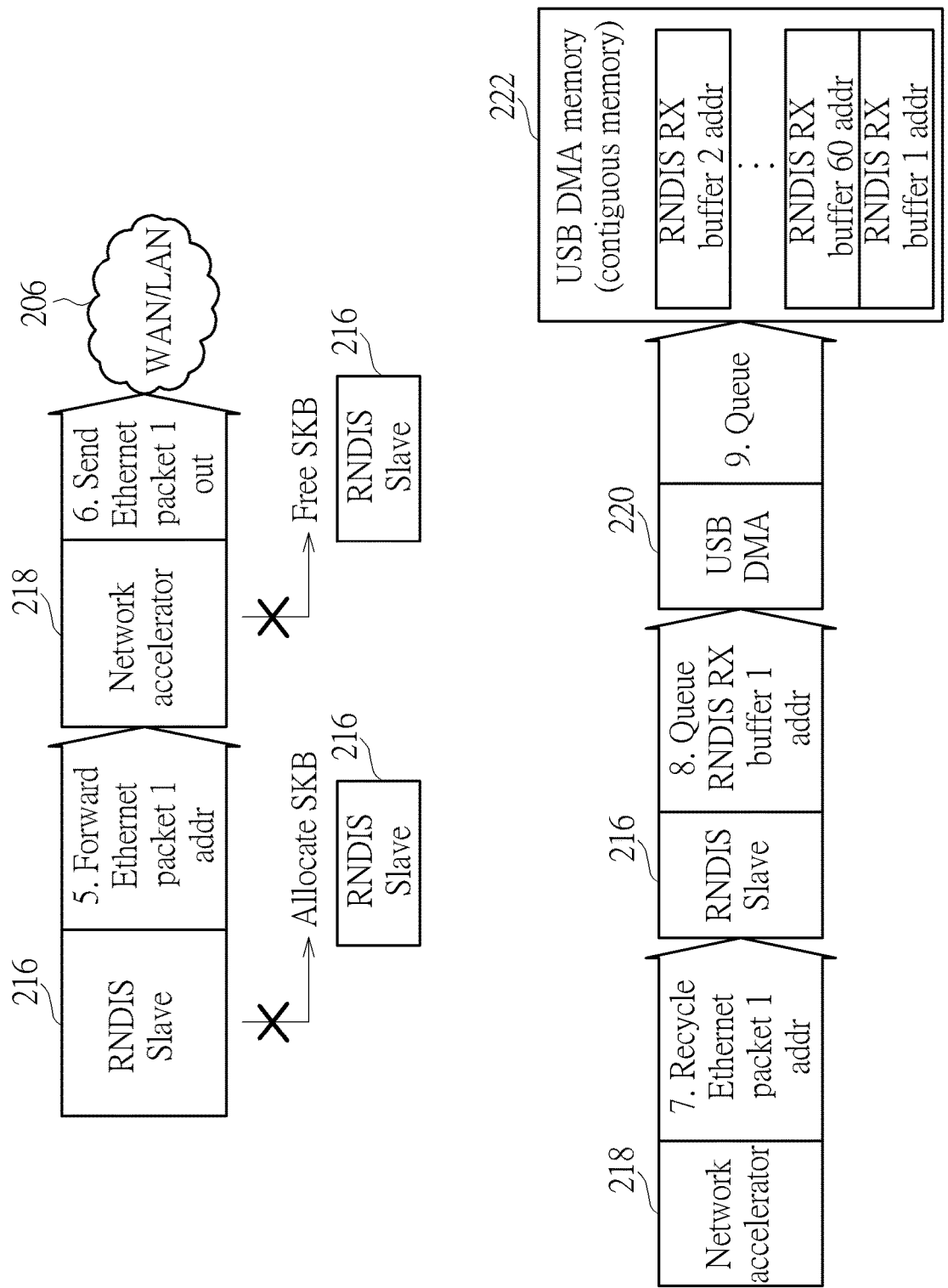
FIG. 7 is a diagram illustrating a second part of an uplink packet forwarding task performed on the router for forwarding a packet without aggregation according to an embodiment of the present invention.

Please refer to FIG. 7 in conjunction with FIG. 5. FIG. 7 is a diagram illustrating a second part of an uplink packet forwarding task performed on the router 204 for forwarding a packet without aggregation according to an embodiment of the present invention. After the Ethernet packet "Ethernet packet 1" is de-encapsulated in the RNDIS slave memory 224 as shown in FIG. 6, the RNDIS slave module 216 forwards an address of the Ethernet packet "Ethernet packet 1" in the RNDIS slave memory 224 to the network accelerator circuit 218. The network accelerator circuit 218 refers to the Ethernet packet address "Ethernet packet 1 addr" to read data of the Ethernet packet "Ethernet packet 1" from the RNDIS slave memory 224, and sends out the Ethernet packet "Ethernet packet 1" to a destination network device via the WAN/LAN 206. When the Ethernet packet "Ethernet packet 1" is sent out by the router 204 (particularly, network accelerator circuit 218 of router 204), the network accelerator circuit 218 notifies the RNDIS slave module 216 to recycle the Ethernet packet "Ethernet packet 1" buffered at the Ethernet packet address "Ethernet packet 1 addr" (particularly, the RNDIS RX buffer "RNDIS RX buffer 1" that buffers the Ethernet packet "Ethernet packet 1"). The RNDIS slave module 216 enqueues the RNDIS RX buffer address "RNDIS RX buffer 1 addr" to the USB DMA memory 222 through the USB DMA controller 220. With the help of DMA management, the RNDIS RX buffer address "RNDIS RX buffer 1 addr" is available in the USB DMA memory 222 again. Since the RNDIS RX buffer "RNDIS RX buffer 1" allocated at the RNDIS RX buffer address "RNDIS RX buffer 1 addr" in the RNDIS slave memory 224 is recycled without being released, the same RNDIS RX buffer "RNDIS RX buffer 1" can be reused to buffer other packet(s) later. It should be noted that no SKB allocation instruction for a new RNDIS RX buffer in the RNDIS slave memory 224 is executed by the RNDIS slave module 216 when the address of the Ethernet packet "Ethernet packet 1" in the RNDIS slave memory 224 is forwarded to the network accelerator circuit 218, and no SKB free instruction for the RNDIS RX buffer "RNDIS RX buffer 1" in the RNDIS slave memory 224 is executed by the RNDIS slave module 216 when the Ethernet packet "Ethernet packet 1" in the RNDIS slave memory 224 is sent out by the network accelerator circuit 218. In this way, the load of the software-based packet forwarding performed by the Linux kernel 120 running on the processor 104 can be greatly reduced, and/or the T-put performance of the router 204 can be improved.

Figure 8:
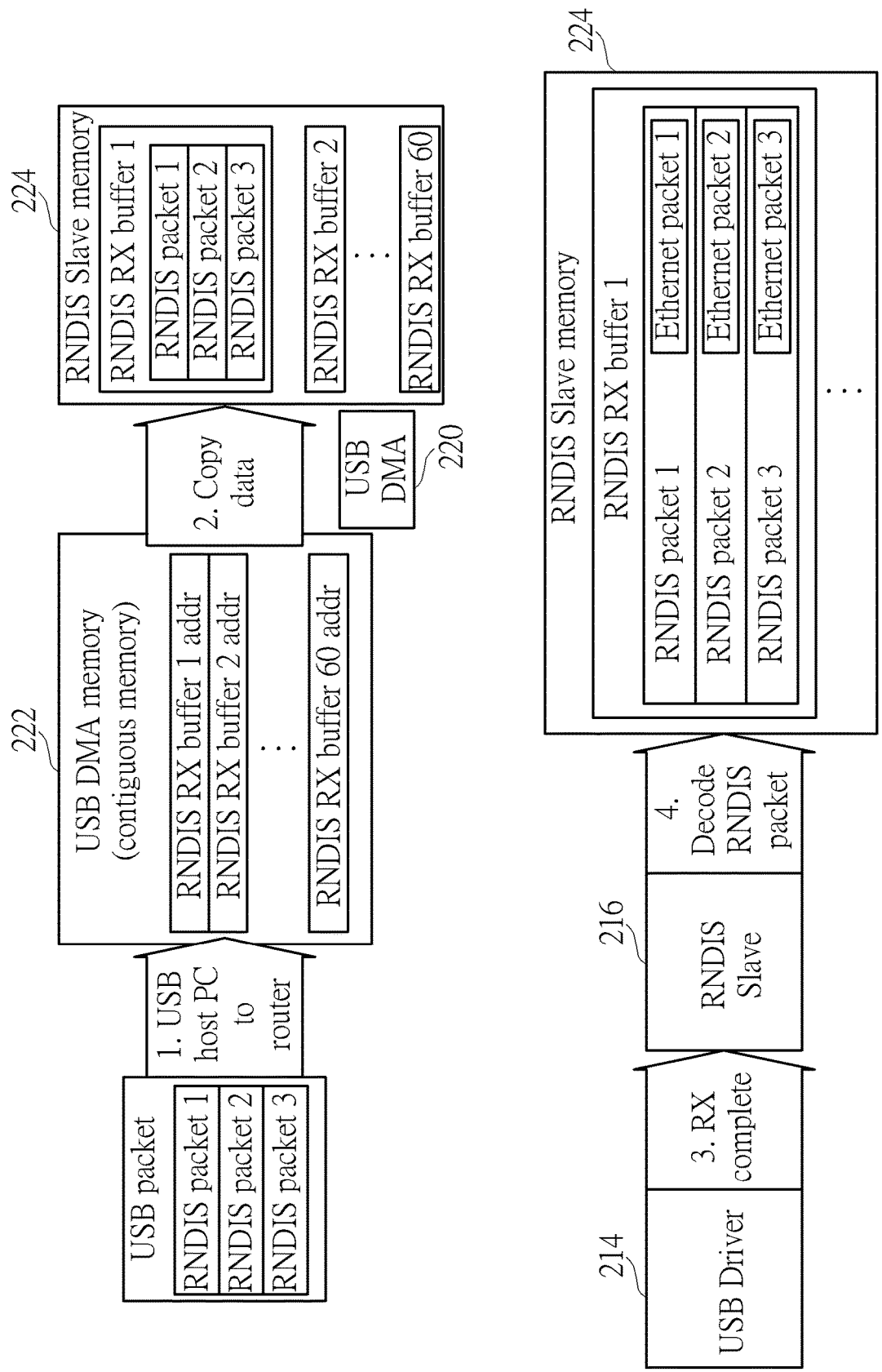
FIG. 8 is a diagram illustrating a first part of an uplink packet forwarding task performed on the router for forwarding a packet with aggregation according to an embodiment of the present invention.

Please refer to FIG. 8 in conjunction with FIG. 5. FIG. 8 is a diagram illustrating a first part of an uplink packet forwarding task performed on the router 204 for forwarding a packet with aggregation according to an embodiment of the present invention. As shown in FIG. 8, a USB packet (which contains multiple RNDIS packets "RNDIS packet 1", "RNDIS packet 2", and "RNDIS packet 3") is transmitted from the USB host PC 202 and received by the router 204. An RNDIS RX buffer address (e.g., "RNDIS RX buffer 1 addr") is dequeued from the USB DMA memory 222, and the USB DMA controller 220 refers to the RNDIS RX buffer address "RNDIS RX buffer 1 addr" for copying data of the RNDIS packets "RNDIS packet 1", "RNDIS packet 2", and "RNDIS packet 3" to the same RNDIS RX buffer "RNDIS RX buffer 1" allocated at the RNDIS RX buffer address "RNDIS RX buffer 1 addr" in the RNDIS slave memory 224. After data of the RNDIS packets "RNDIS packet 1", "RNDIS packet 2", and "RNDIS packet 3" are successfully stored into the RNDIS RX buffer "RNDIS RX buffer 1", the USB driver 214 informs the RNDIS slave module 216 of "RX complete" notification. Next, the RNDIS slave module 216 decodes (or de-encapsulates) the RNDIS packets "RNDIS packet 1", "RNDIS packet 2", and "RNDIS packet 3" for obtaining an Ethernet packet "Ethernet packet 1" contained in the RNDIS packet "RNDIS packet 1", an Ethernet packet "Ethernet packet 2" contained in the RNDIS packet "RNDIS packet 2", and an Ethernet packet "Ethernet packet 3" contained in the RNDIS packet "RNDIS packet 3". For example, the Ethernet packet "Ethernet packet 1" may be obtained by removing an RNDIS header from the RNDIS packet "RNDIS packet 1", the Ethernet packet "Ethernet packet 2" may be obtained by removing an RNDIS header from the RNDIS packet "RNDIS packet 2", and the Ethernet packet "Ethernet packet 3" may be obtained by removing an RNDIS header from the RNDIS packet "RNDIS packet 3".

Figure 9:
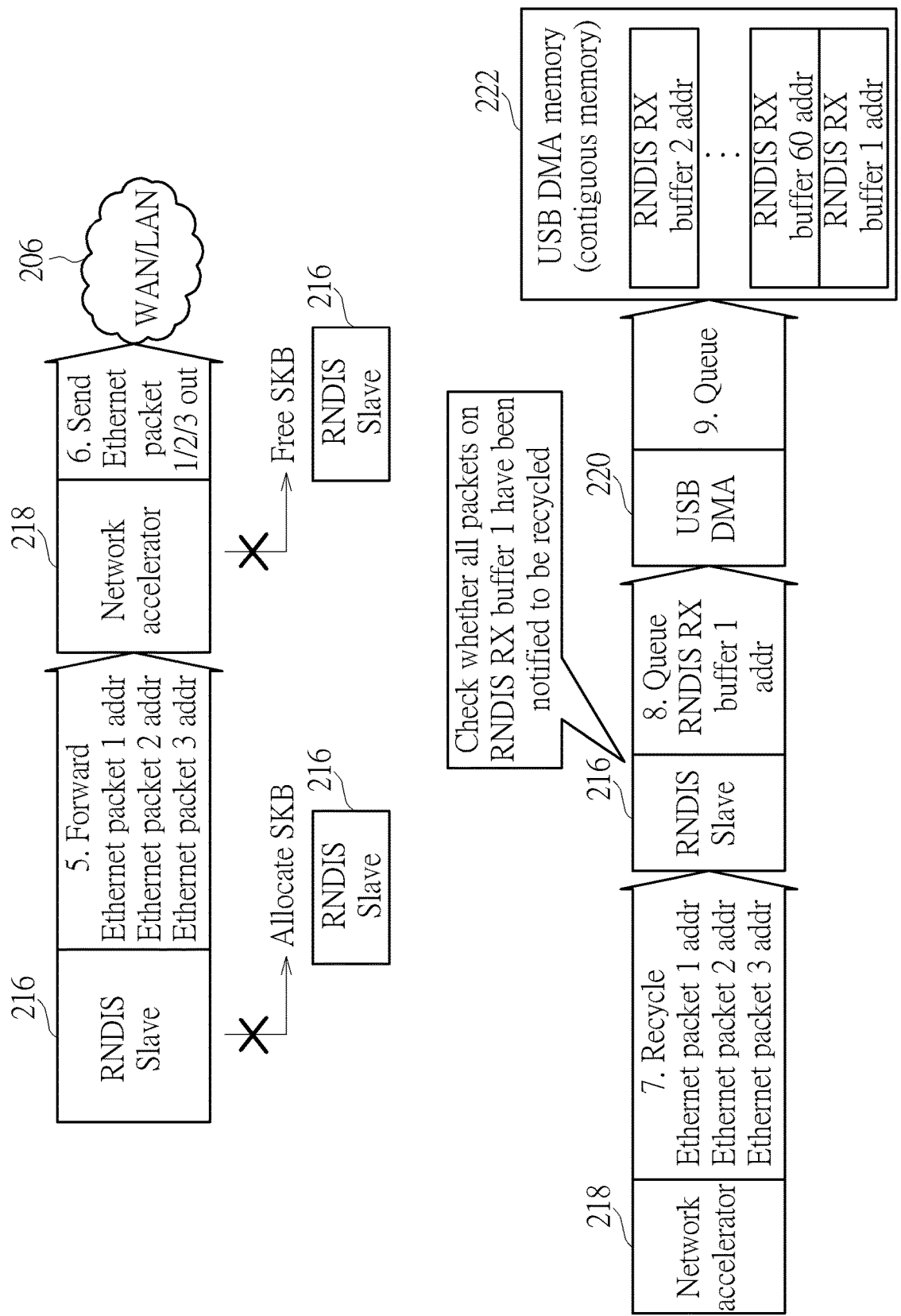
FIG. 9 is a diagram illustrating a second part of an uplink packet forwarding task performed on the router for forwarding a packet with aggregation according to an embodiment of the present invention.

Please refer to FIG. 9 in conjunction with FIG. 5. FIG. 9 is a diagram illustrating a second part of an uplink packet forwarding task performed on the router 204 for forwarding a packet with aggregation according to an embodiment of the present invention. After the Ethernet packets "Ethernet packet 1", "Ethernet packet 2", and "Ethernet packet 3" are de-encapsulated in the RNDIS slave memory 224 as shown in FIG. 8, the RNDIS slave module 216 forwards addresses of the Ethernet packets "Ethernet packet 1", "Ethernet packet 2", and "Ethernet packet 3" in the RNDIS slave memory 224 to the network accelerator circuit 218. Hence, the network accelerator circuit 218 refers to the Ethernet packet addresses "Ethernet packet 1 addr", "Ethernet packet 2 addr", and "Ethernet packet 3 addr" to read the Ethernet packets "Ethernet packet 1", "Ethernet packet 2", and "Ethernet packet 3" from the RNDIS slave memory 224, and sends out the Ethernet packets "Ethernet packet 1", "Ethernet packet 2", and "Ethernet packet 3" to a destination network device via the WAN/LAN 206. When the Ethernet packets "Ethernet packet 1", "Ethernet packet 2", and "Ethernet packet 3" are sent out by the router 204 (particularly, network accelerator circuit 218 of router 204), the network accelerator circuit 218 notifies the RNDIS slave module 216 to recycle the Ethernet packet "Ethernet packet 1" buffered at the Ethernet packet address "Ethernet packet 1 addr", the Ethernet packet "Ethernet packet 2" buffered at the Ethernet packet address "Ethernet packet 2 addr", and the Ethernet packet "Ethernet packet 3" buffered at the Ethernet packet address "Ethernet packet 3 addr" (particularly, the RNDIS RX buffer "RNDIS RX buffer 1" that buffers all of the Ethernet packets "Ethernet packet 1", "Ethernet packet 2", and "Ethernet packet 3"). The RNDIS slave module 216 enqueues the RNDIS RX buffer address "RNDIS RX buffer 1 addr" to the USB DMA memory 222 through the USB DMA controller 220. With the help of DMA management, the same RNDIS RX buffer address "RNDIS RX buffer 1 addr" is available in the USB DMA memory 222 again. Since the RNDIS RX buffer "RNDIS RX buffer 1" allocated at the RNDIS RX buffer address "RNDIS RX buffer 1 addr" in the RNDIS slave memory 224 is recycled without being released, the same RNDIS RX buffer "RNDIS RX buffer 1" can be reused to buffer other packet(s) later. It should be noted that no SKB allocation instruction for a new RNDIS RX buffer in the RNDIS slave memory 224 is executed by the RNDIS slave module 216 when the addresses of the Ethernet packets "Ethernet packet 1", "Ethernet packet 2", and "Ethernet packet 3" in the RNDIS slave memory 224 are forwarded to the network accelerator circuit 218, and no SKB free instruction for the RNDIS RX buffer "RNDIS RX buffer 1" in the RNDIS slave memory 224 is executed by the RNDIS slave module 216 when the Ethernet packets "Ethernet packet 1", "Ethernet packet 2", and "Ethernet packet 3" in the RNDIS slave memory 224 are sent out by the network accelerator circuit 218. In this way, the load of the software-based packet forwarding performed by the Linux kernel 120 running on the processor 104 can be greatly reduced, and/or the T-put performance of the router 204 can be improved.

Figure 10:
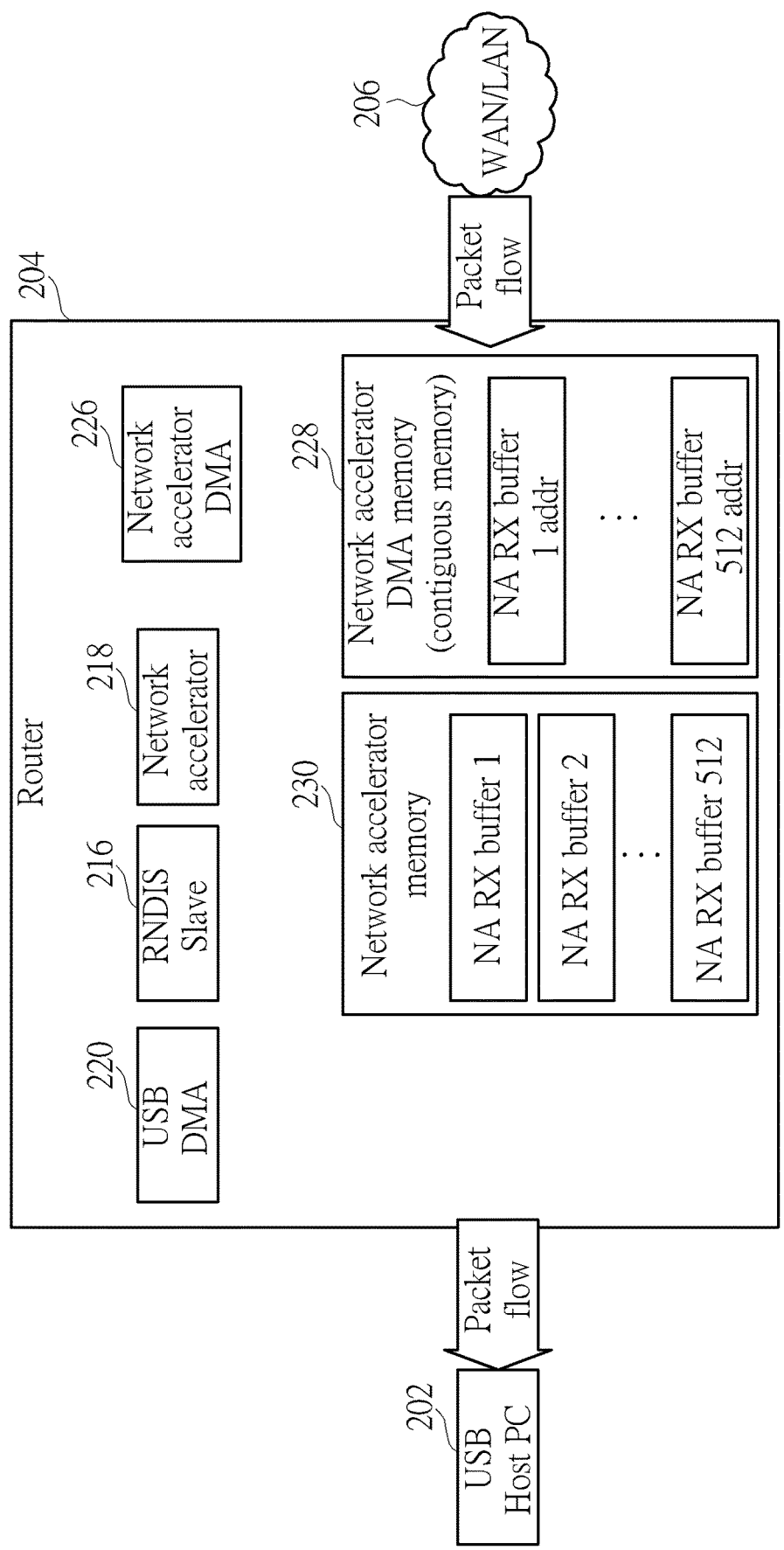
FIG. 10 is a diagram illustrating a configuration of the router having the RNDIS slave module that operates in a TX mode for downlink packet forwarding without aggregation according to an embodiment of the present invention.

FIG. 10 is a diagram illustrating a configuration of the router 204 having the RNDIS slave module 216 that operates in a TX mode for downlink packet forwarding without aggregation according to an embodiment of the present invention. The router 204 may be implemented using the packet forwarding apparatus 100 shown in FIG. 1, where the wired/wireless interface DMA controller 102 is implemented by the USB DMA controller (labeled by "USB DMA") 220, the RNDIS/NCM slave module 122 of the Linux kernel 120 is implemented by the RNDIS slave module (labeled by "RNDIS slave") 216, the network accelerator circuit 106 is implemented by the network accelerator circuit 218, the network accelerator DMA controller 108 is implemented by the network accelerator DMA controller (labeled by "network accelerator DMA") 226, the network accelerator DMA memory 118 is implemented by the network accelerator DMA memory 228, and the network accelerator memory 116 is implemented by the network accelerator memory 230. The network accelerator memory 230 may have a plurality of network accelerator (NA) RX buffers (e.g., "NA RX buffer 1" to "NA RX buffer 512") allocated therein. The network accelerator DMA memory 228 is a contiguous memory for storing addresses at which the NA RX buffers are allocated in the network accelerator memory 230. As shown in FIG. 10, the NA RX buffer addresses (e.g., "NA RX buffer 1 addr" to "NA RX buffer 512 addr") are stored in contiguous addresses of the network accelerator DMA memory 228. For example, the network accelerator DMA memory 228 may operate like a circular queue.

Figure 11:
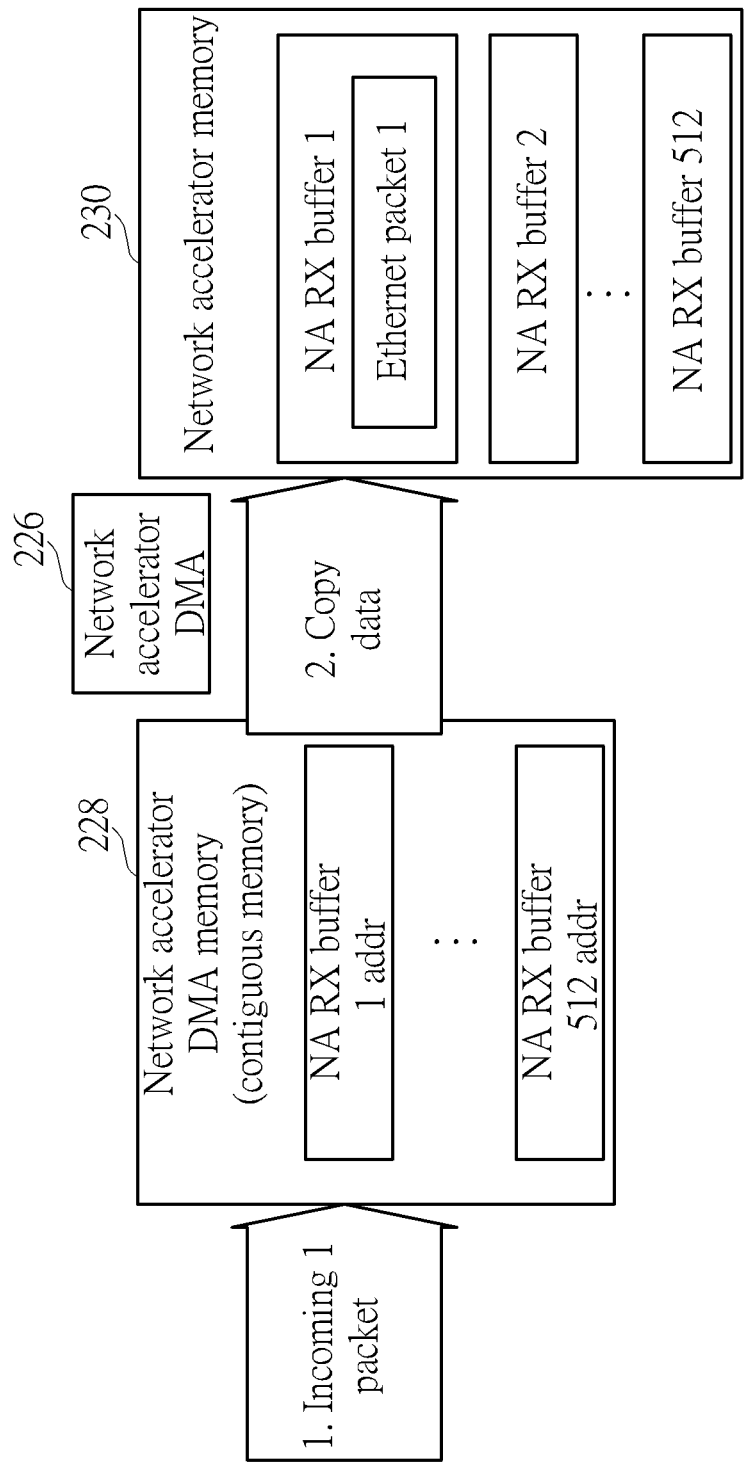
FIG. 11 is a diagram illustrating a first part of a downlink packet forwarding task performed on the router for forwarding a packet without aggregation according to an embodiment of the present invention.

Please refer to FIG. 11 in conjunction with FIG. 10. FIG. 11 is a diagram illustrating a first part of a downlink packet forwarding task performed on the router 204 for forwarding a packet without aggregation according to an embodiment of the present invention. As shown in FIG. 11, an incoming packet (e.g., one Ethernet packet "Ethernet packet 1") is transmitted from a source network device and received by the router 204. An NA RX buffer address (e.g., "NA RX buffer 1 addr") is dequeued from the network accelerator DMA memory 228, and the network accelerator DMA controller 226 refers to the NA RX buffer address "NA RX buffer 1 addr" for copying data of the Ethernet packet "Ethernet packet 1" to the NA RX buffer "NA RX buffer 1" allocated at the NA RX buffer address "NA RX buffer 1 addr" in the network accelerator memory 230.

Figure 12:
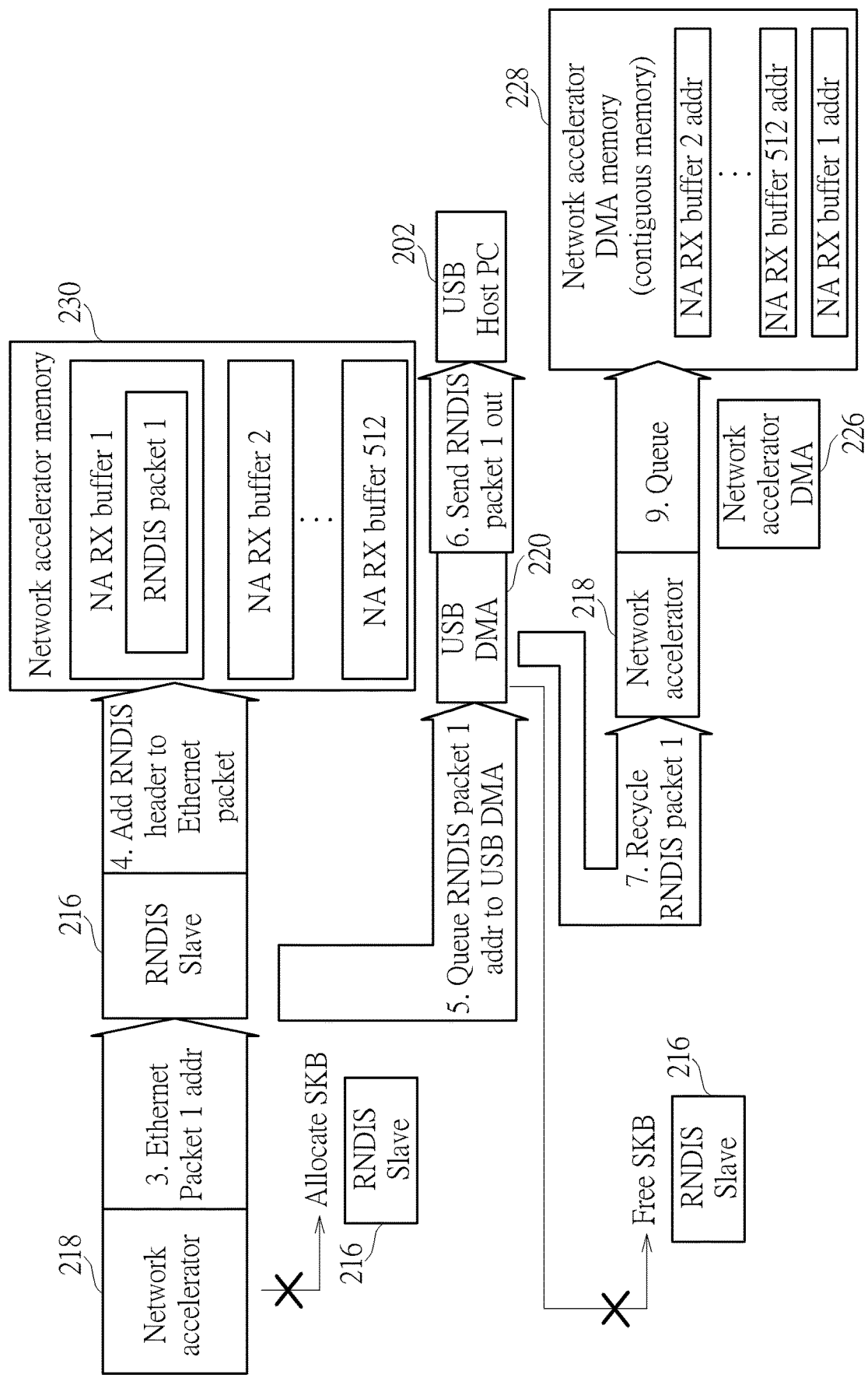
FIG. 12 is a diagram illustrating a second part of a downlink packet forwarding task performed on the router for forwarding a packet without aggregation according to an embodiment of the present invention.

Please refer to FIG. 12 in conjunction with FIG. 10. FIG. 12 is a diagram illustrating a second part of a downlink packet forwarding task performed on the router 204 for forwarding a packet without aggregation according to an embodiment of the present invention. After data of the Ethernet packet "Ethernet packet 1" are successfully stored into the network accelerator memory 230 as shown in FIG. 11, the network accelerator circuit 218 forwards an address of the Ethernet packet "Ethernet packet 1" in the network accelerator memory 230 to the RNDIS slave module 216. The RNDIS slave module 216 refers to the Ethernet packet address "Ethernet packet 1 addr" to access the Ethernet packet "Ethernet packet 1" in the network accelerator memory 230, and encodes (or encapsulates) the Ethernet packet "Ethernet packet 1" for adding an RNDIS header to the Ethernet packet "Ethernet packet 1", resulting in an RNDIS packet "RNDIS packet 1" that contains the Ethernet packet "Ethernet packet 1". In addition, the RNDIS slave module 216 enqueues an address of the RNDIS packet "RNDIS packet 1" in the network accelerator memory 230 to the USB DMA controller 220. Hence, the USB DMA controller 220 refers to the RNDIS packet address "RNDIS packet 1 addr" to read the RNDIS packet "RNDIS packet 1" from the network accelerator memory 230, and sends out the RNDIS packet "RNDIS packet 1" to the USB host PC 202.

When the RNDIS packet "RNDIS packet 1" is sent out by the router 204 (particularly, USB DMA controller 220 of router 204), the RNDIS slave module 216 notifies the network accelerator circuit 218 to recycle the RNDIS packet "RNDIS packet 1" buffered at the RNDIS packet address "RNDIS packet 1 addr" (particularly, the NA RX buffer "NA RX buffer 1" that buffers the RNDIS packet "RNDIS packet 1"). The network accelerator circuit 218 enqueues the NA RX buffer address "NA RX buffer 1 addr" to the network accelerator DMA memory 228 through the network accelerator DMA circuit 226. With the help of DMA management, the same NA RX buffer address "NA RX buffer 1 addr" is available in the network accelerator DMA memory 228 again. Since the NA RX buffer "NA RX buffer 1" allocated at the NA RX buffer address "NA RX buffer 1 addr" in the network accelerator memory 230 is recycled without being released, the same NA RX buffer "NA RX buffer 1" can be reused to buffer other packet(s) later. It should be noted that no SKB allocation instruction for a new NA RX buffer in the network accelerator memory 230 is executed by the RNDIS slave module 216 when the address of the Ethernet packet "Ethernet packet 1" in the network accelerator memory 230 is forwarded to the RNDIS slave module 216, and no SKB free instruction for the NA RX buffer "NA RX buffer 1" in the network accelerator memory 230 is executed by the RNDIS slave module 216 when the RNDIS packet "RNDIS packet 1" in the network accelerator memory 230 is sent out by the USB DMA controller 220. In this way, the load of the software-based packet forwarding performed by the Linux kernel 120 running on the processor 104 can be greatly reduced, and/or the T-put performance of the router 204 can be improved.

Figure 13:
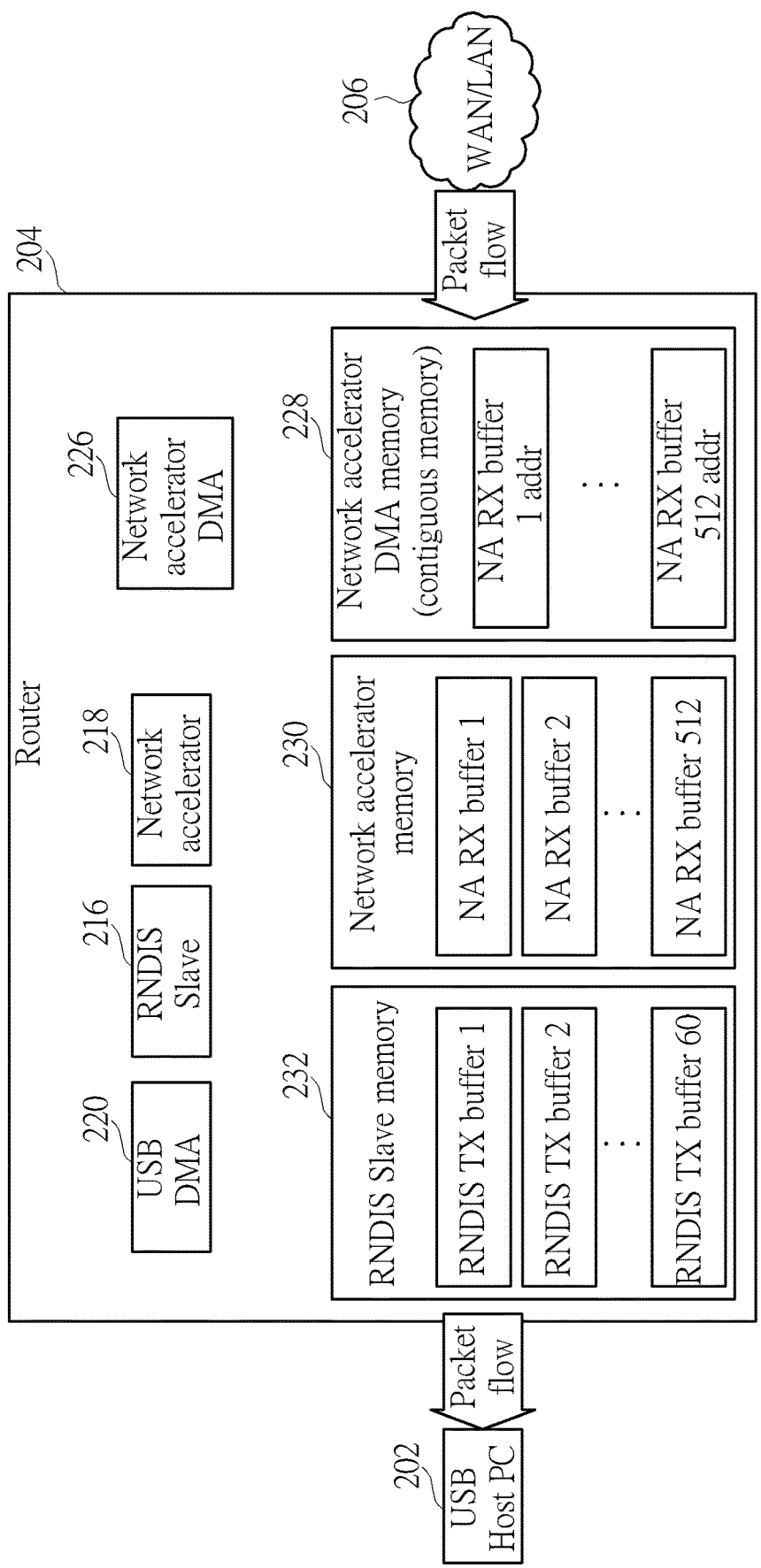
FIG. 13 is a diagram illustrating a configuration of the router 204 having the RNDIS slave module that operates in a TX mode for downlink packet forwarding with aggregation according to an embodiment of the present invention.

FIG. 13 is a diagram illustrating a configuration of the router 204 having the RNDIS slave module 216 that operates in a TX mode for downlink packet forwarding with aggregation according to an embodiment of the present invention. The router 204 may be implemented using the packet forwarding apparatus 100 shown in FIG. 1, where the wired/wireless interface DMA controller 102 is implemented by the USB DMA controller (labeled by "USB DMA") 220, the RNDIS/NCM slave module 122 of the Linux kernel 120 is implemented by the RNDIS slave module (labeled by "RNDIS slave") 216, the network accelerator circuit 106 is implemented by the network accelerator circuit 218, the network accelerator DMA controller 108 is implemented by the network accelerator DMA controller (labeled by "network accelerator DMA") 226, the network accelerator DMA memory 118 is implemented by the network accelerator DMA memory 228, the network accelerator memory 116 is implemented by the network accelerator memory 230, and the RNDIS/NCM slave memory 114 is implemented by the RNDIS slave memory 232. The RNDIS slave memory 232 may have a plurality of RNDIS TX buffers (e.g., "RNDIS TX buffer 1" to "RNDIS TX buffer 60") allocated therein. The network accelerator memory 230 may have a plurality of network accelerator (NA) RX buffers (e.g., "NA RX buffer 1" to "NA RX buffer 512") allocated therein. The network accelerator DMA memory 228 is a contiguous memory for storing addresses of the NA RX buffers allocated in the network accelerator memory 230. As shown in FIG. 13, the NA RX buffer addresses (e.g., "NA RX buffer 1 addr" to "NA RX buffer 512 addr") are stored in contiguous addresses of the network accelerator DMA memory 228. For example, the network accelerator DMA memory 228 may operate like a circular queue.

Figure 14:
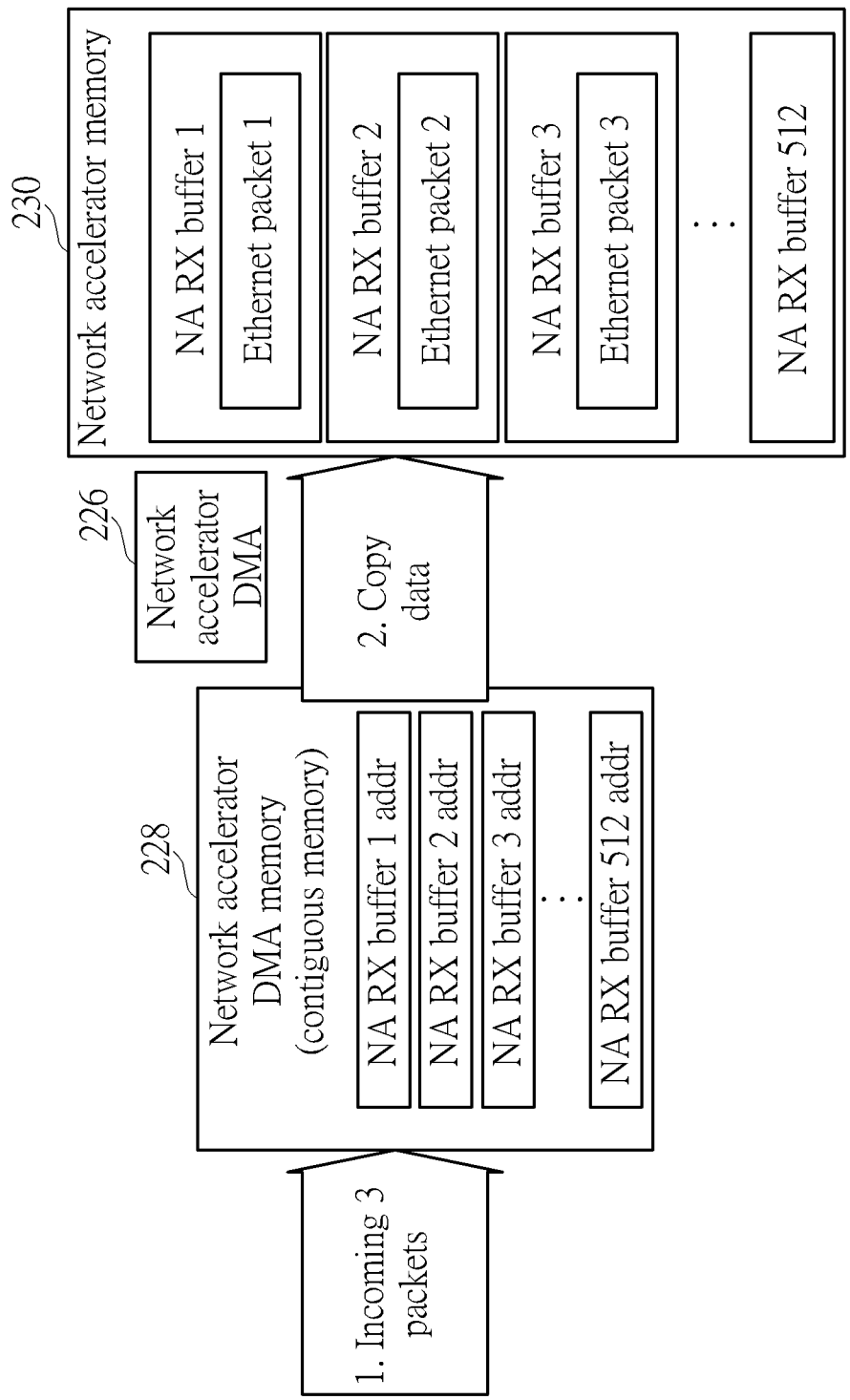
FIG. 14 is a diagram illustrating a first part of a downlink packet forwarding task performed on the router for forwarding a packet with aggregation according to an embodiment of the present invention.

Please refer to FIG. 14 in conjunction with FIG. 13. FIG. 14 is a diagram illustrating a first part of a downlink packet forwarding task performed on the router 204 for forwarding a packet with aggregation according to an embodiment of the present invention. As shown in FIG. 14, multiple incoming packets (e.g. three Ethernet packets "Ethernet packet 1", "Ethernet packet 2", and "Ethernet packet 3") are sequentially transmitted from a source network device and received by the router 204. Three NA RX buffer addresses "NA RX buffer 1 addr", "NA RX buffer 2 addr", and "NA RX buffer 3 addr" are sequentially dequeued from the network accelerator DMA memory 228. The network accelerator DMA controller 226 refers to the NA RX buffer address "NA RX buffer 1 addr" for copying data of the Ethernet packet "Ethernet packet 1" to the NA RX buffer "NA RX buffer 1" allocated at the NA RX buffer address "NA RX buffer 1 addr" in the network accelerator memory 230, refers to the NA RX buffer address "NA RX buffer 2 addr" for copying data of the Ethernet packet "Ethernet packet 2" to the NA RX buffer "NA RX buffer 2" allocated at the NA RX buffer address "NA RX buffer 2 addr" in the network accelerator memory 230, and refers to the NA RX buffer address "NA RX buffer 3 addr" for copying data of the Ethernet packet "Ethernet packet 3" to the NA RX buffer "NA RX buffer 3" allocated at the NA RX buffer address "NA RX buffer 3 addr" in the network accelerator memory 230.

Figure 15:
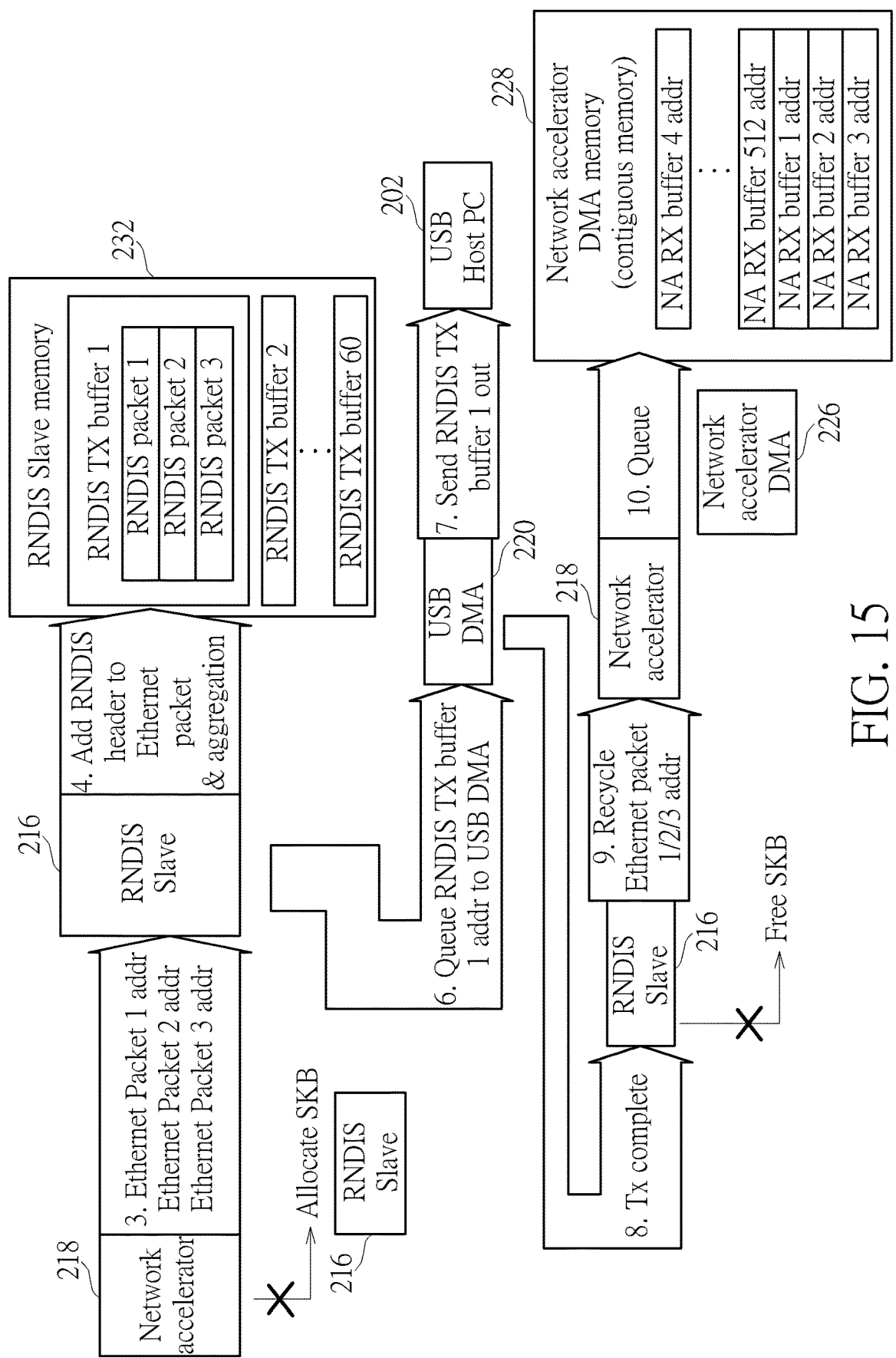
FIG. 15 is a diagram illustrating a first design of a second part of a downlink packet forwarding task performed on the router for forwarding a packet with aggregation according to an embodiment of the present invention.

Please refer to FIG. 15 in conjunction with FIG. 13. FIG. 15 is a diagram illustrating a first design of a second part of a downlink packet forwarding task performed on the router 204 for forwarding a packet with aggregation according to an embodiment of the present invention. After data of the Ethernet packets "Ethernet packet 1", "Ethernet packet 2", and "Ethernet packet 3" are successfully stored into the network accelerator memory 230 as shown in FIG. 14, the network accelerator circuit 218 forwards addresses of the Ethernet packets "Ethernet packet 1", "Ethernet packet 2", and "Ethernet packet 3" in the network accelerator memory 230 to the RNDIS slave module 216. The RNDIS slave module 216 refers to the Ethernet packet address "Ethernet packet 1 addr" to access the Ethernet packet "Ethernet packet 1" in the network accelerator memory 230, encodes (or encapsulates) the Ethernet packet "Ethernet packet 1" for adding an RNDIS header to the Ethernet packet "Ethernet packet 1", and copies data of the RNDIS packet "RNDIS packet 1" (which contains the Ethernet packet "Ethernet packet 1") to the RNDIS TX buffer "RNDIS TX buffer 1" allocated in the RNDIS slave memory 232. Similarly, the RNDIS slave module 216 refers to the Ethernet packet address "Ethernet packet 2 addr" to access the Ethernet packet "Ethernet packet 2" in the network accelerator memory 230, encodes (or encapsulates) the Ethernet packet "Ethernet packet 2" for adding an RNDIS header to the Ethernet packet "Ethernet packet 2", and copies data of the RNDIS packet "RNDIS packet 2" (which contains the Ethernet packet "Ethernet packet 2") to the RNDIS TX buffer "RNDIS TX buffer 1" allocated in the RNDIS slave memory 232; and refers to the Ethernet packet address "Ethernet packet 3 addr" to access the Ethernet packet "Ethernet packet 3" in the network accelerator memory 230, encodes (or encapsulates) the Ethernet packet "Ethernet packet 3" for adding an RNDIS header to the Ethernet packet "Ethernet packet 3", and copies data of the RNDIS packet "RNDIS packet 3" (which contains the Ethernet packet "Ethernet packet 3") to the RNDIS TX buffer "RNDIS TX buffer 1" allocated in the RNDIS slave memory 232. Specifically, the RNDIS packets "RNDIS packet 1", "RNDIS packet 2", and "RNDIS packet 3" are buffered in the same RNDIS TX buffer "RNDIS TX buffer 1" for aggregation. The RNDIS slave module 216 enqueues an address of the RNDIS TX buffer "RNDIS TX buffer 1" in the RNDIS slave memory 232 to the USB DMA circuit 220. Hence, the USB DMA controller 220 refers to the RNDIS TX buffer address "RNDIS TX buffer 1 addr" to read the RNDIS TX buffer "RNDIS TX buffer 1" (particularly, RNDIS packets "RNDIS packet 1", "RNDIS packet 2", and "RNDIS packet 3" buffered in RNDIS TX buffer "RNDIS TX buffer 1") for sending out one USB packet with RNDIS packet aggregation (e.g., one USB packet that contains three RNDIS packets "RNDIS packet 1", "RNDIS packet 2", and "RNDIS packet 3") to the USB host PC 202.

When the RNDIS packets "RNDIS packet 1", "RNDIS packet 2", and "RNDIS packet 3" are sent out by the router 204 (particularly, USB DMA controller 220 of router 204), the USB DMA controller 220 informs the RNDIS slave module 216 of "TX compete" notification. Next, the RNDIS slave module 216 notifies the network accelerator circuit 218 to recycle the Ethernet packets "Ethernet packet 1", "Ethernet packet 2", and "Ethernet packet 3" buffered at Ethernet packet addresses "Ethernet packet 1 addr", "Ethernet packet 2 addr", and "Ethernet packet 3 addr" (particularly, the NA RX buffer "NA RX buffer 1" that buffers the Ethernet packet "Ethernet packet 1", the NA RX buffer "NA RX buffer 2" that buffers the Ethernet packet "Ethernet packet 2", and the NA RX buffer "NA RX buffer 3" that buffers the Ethernet packet "Ethernet packet 3"). The network accelerator circuit 218 enqueues the NA RX buffer addresses "NA RX buffer 1 addr", "NA RX buffer 2 addr", and "NA RX buffer 3 addr" to the network accelerator DMA memory 228 through the network accelerator DMA circuit 226. With the help of DMA management, the same NA RX buffer addresses "NA RX buffer 1 addr", "NA RX buffer 2 addr", and "NA RX buffer 3 addr" are available in the network accelerator DMA memory 228 again. Since the NA RX buffer "NA RX buffer 1" allocated at the NA RX buffer address "NA RX buffer 1 addr" in the network accelerator memory 230, the NA RX buffer "NA RX buffer 2" allocated at the NA RX buffer address "NA RX buffer 2 addr" in the network accelerator memory 230, and the NA RX buffer "NA RX buffer 3" allocated at the NA RX buffer address "NA RX buffer 3 addr" in the network accelerator memory 230 are recycled without being released, each of the NA RX buffers "NA RX buffer 1", "NA RX buffer 2", and "NA RX buffer 3" can be reused to buffer other packet(s) later. It should be noted that no SKB allocation instructions for new NA RX buffers in the network accelerator memory 230 are executed by the RNDIS slave module 216 when the addresses of the Ethernet packets "Ethernet packet 1", "Ethernet packet 2", and "Ethernet packet 3" in the network accelerator memory 230 are forwarded to the RNDIS slave module 216, and no SKB free instructions for the NA RX buffers "NA RX buffer 1", "NA RX buffer 2", and "NA RX buffer 3" in the network accelerator memory 230 are executed by the RNDIS slave module 216 when the RNDIS packets "RNDIS packet 1", "RNDIS packet 2", and "RNDIS packet 1" in the same RNDIS TX buffer "RNDIS TX buffer 1" of the RNDIS slave memory 232 are sent out by the USB DMA controller 220. In this way, the load of the software-based packet forwarding performed by the Linux kernel 120 running on the processor 104 can be greatly reduced, and/or the T-put performance of the router 204 can be improved.

In above embodiment shown in FIG. 14, the buffer recycling is started by the RNDIS slave module 216 after all of the RNDIS packets "RNDIS packet 1", "RNDIS packet 2", and "RNDIS packet 1" in the same RNDIS TX buffer "RNDIS TX buffer 1" of the RNDIS slave memory 232 are aggregated in one USB packet and then sent out by the USB DMA controller 220. Hence, the NA RX buffers "NA RX buffer 1", "NA RX buffer 2", and "NA RX buffer 3" in the network accelerator memory 230 may be recycled at the same time. Alternatively, one buffer recycling may be started by the RNDIS slave module 216 each time one of the RNDIS packets "RNDIS packet 1", "RNDIS packet 2", and "RNDIS packet 1" in the same RNDIS TX buffer "RNDIS TX buffer 1" of the RNDIS slave memory 232 is sent out by the USB DMA controller 220. Hence, the NA RX buffers "NA RX buffer 1", "NA RX buffer 2", and "NA RX buffer 3" in the network accelerator memory 230 may be recycled one by one. The same objective of recycling/reusing the NA RX buffers "NA RX buffer 1", "NA RX buffer 2", and "NA RX buffer 3" is achieved.

Figure 16:
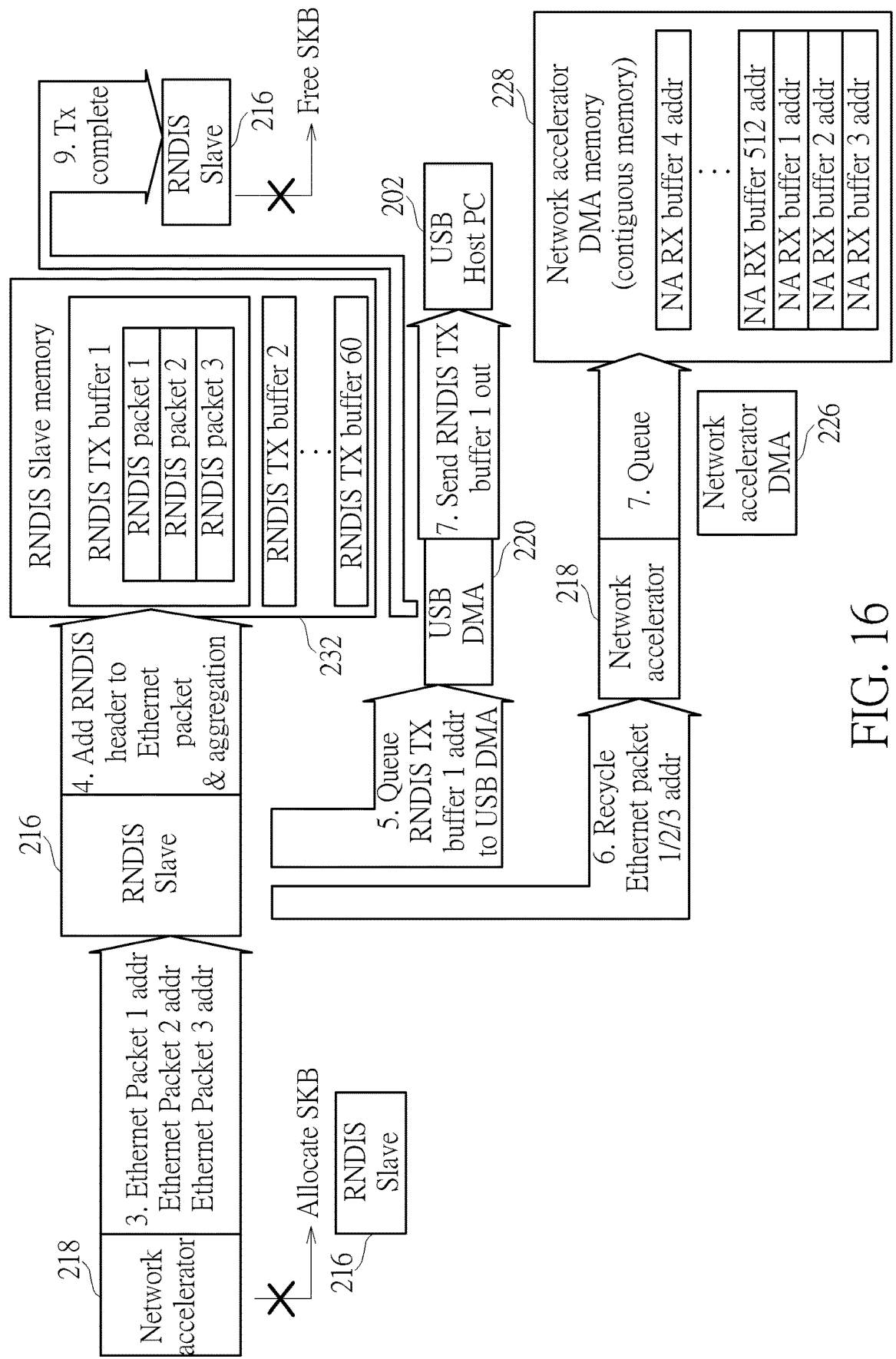
FIG. 16 is a diagram illustrating a second design of a second part of a downlink packet forwarding task performed on the router for forwarding a packet with aggregation according to an embodiment of the present invention.

In some embodiments of the present invention, the buffer recycling may be started by the RNDIS slave module 216 earlier. Please refer to FIG. 16 in conjunction with FIG. 13. FIG. 16 is a diagram illustrating a second design of a second part of a downlink packet forwarding task performed on the router 204 for forwarding a packet with aggregation according to an embodiment of the present invention. The major difference between the packet forwarding flows shown in FIG. 15 and FIG. 16 is that the RNDIS slave module 216 notifies the network accelerator circuit 218 to recycle the Ethernet packets "Ethernet packet 1", "Ethernet packet 2", and "Ethernet packet 3" buffered at Ethernet packet addresses "Ethernet packet 1 addr", "Ethernet packet 2 addr", and "Ethernet packet 3 addr" (particularly, the NA RX buffer "NA RX buffer 1" that buffers the Ethernet packet "Ethernet packet 1", the NA RX buffer "NA RX buffer 3" that buffers the Ethernet packet "Ethernet packet 3", and the NA RX buffer "NA RX buffer 3" that buffers the Ethernet packet "Ethernet packet 3") when the RNDIS slave module 216 has copied data of the RNDIS packets "RNDIS packet 1" (which contains the Ethernet packet "Ethernet packet 1"), "RNDIS packet 2" (which contains the Ethernet packet "Ethernet packet 2"), and "RNDIS packet 3" (which contains the Ethernet packet "Ethernet packet 3") to the same RNDIS TX buffer "RNDIS TX buffer 1" allocated in the RNDIS slave memory 232.

In above embodiment shown in FIG. 16, the buffer recycling is started by the RNDIS slave module 216 after all of the RNDIS packets "RNDIS packet 1", "RNDIS packet 2", and "RNDIS packet 3" are copied to the same RNDIS TX buffer "RNDIS TX buffer 1" of the RNDIS slave memory 232 for aggregation. Hence, the NA RX buffers "NA RX buffer 1", "NA RX buffer 2", and "NA RX buffer 3" in the network accelerator memory 230 may be recycled at the same time. Alternatively, one buffer recycling may be started by the RNDIS slave module 216 each time one of the RNDIS packets "RNDIS packet 1", "RNDIS packet 2", and "RNDIS packet 1" is copied to the RNDIS TX buffer "RNDIS TX buffer 1" of the RNDIS slave memory 232. Hence, the NA RX buffers "NA RX buffer 1", "NA RX buffer 2", and "NA RX buffer 3" in the network accelerator memory 230 may be recycled one by one. The same objective of recycling/reusing the NA RX buffers "NA RX buffer 1", "NA RX buffer 2", and "NA RX buffer 3" is achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet forwarding apparatus comprising:
a first storage device, wherein the first storage device has a plurality of buffers allocated therein, and at least one buffer included in the plurality of buffers is arranged to buffer at least one packet; and
a processor, arranged to execute a Linux kernel to perform software-based packet forwarding associated with the at least one packet;
wherein the at least one buffer allocated in the first storage device is recycled through direct memory access (DMA) management which enqueues at least one address of the at least one buffer allocated in the first storage device for later reuse of the at least one buffer via DMA, and reused for buffering at least one other packet.

2. The packet forwarding apparatus of claim 1, wherein the Linux kernel running on the processor does not allocate at least one new buffer in the first storage device during packet forwarding of the at least one packet.

3. The packet forwarding apparatus of claim 1, wherein the Linux kernel running on the processor does not free the at least one buffer in the first storage device during packet forwarding of the at least one packet.

4. The packet forwarding apparatus of claim 1, wherein the Linux kernel does not support packet aggregation or does not enable packet aggregation, the at least one packet comprises only a single packet, and the at least one buffer comprises only a single buffer that is arranged to buffer the single packet.

5. The packet forwarding apparatus of claim 4, further comprising:
  a network accelerator circuit, arranged to perform hardware-based packet forwarding associated with the at least one packet, wherein the hardware-based packet forwarding comprises:
    sending out the single packet; and
    notifying the Linux kernel to recycle the single packet when the single packet is sent out by the network accelerator circuit.

6. The packet forwarding apparatus of claim 5, further comprising:
  a second storage device, accessible to a DMA controller and arranged to buffer a plurality of addresses at which the plurality of buffers are allocated in the first storage device;
  wherein when the single packet is sent out by the network accelerator circuit, the Linux kernel running on the processor is further arranged to enqueue an address of the single buffer to the second storage device through the DMA controller.

7. The packet forwarding apparatus of claim 4, further comprising:
  a network accelerator circuit, arranged to perform hardware-based packet forwarding associated with the at least one packet;
  wherein the Linux kernel running on the processor is further arranged to notify the network accelerator circuit to recycle the single packet when the single packet is sent out by the network accelerator circuit.

8. The packet forwarding apparatus of claim 7, further comprising:
  a second storage device, accessible to a DMA controller and arranged to buffer a plurality of addresses at which the plurality of buffers are allocated in the first storage device;
  wherein when the single packet is sent out by the packet forwarding apparatus, the network accelerator circuit is further arranged to enqueue an address of the single buffer to the second storage device through the DMA controller.

9. The packet forwarding apparatus of claim 1, wherein the Linux kernel enables packet aggregation, the at least one packet comprises multiple packets, and the at least one buffer comprises multiple buffers that are arranged to buffer the multiple packets, respectively.

10. The packet forwarding apparatus of claim 9, further comprising:
  a network accelerator circuit, arranged to perform hardware-based packet forwarding associated with the at least one packet, wherein the hardware-based packet forwarding comprises:
    sending out the multiple packets; and
    notifying the Linux kernel to recycle the multiple packets when the multiple packets are sent out by the network accelerator circuit.

11. The packet forwarding apparatus of claim 10, further comprising:
  a second storage device, accessible to a DMA controller and arranged to buffer a plurality of addresses at which the plurality of buffers are allocated in the first storage device;
  wherein when the multiple packets are sent out by the network accelerator circuit, the Linux kernel running on the processor is further arranged to enqueue addresses of the multiple buffers to the second storage device through the DMA controller.

12. The packet forwarding apparatus of claim 9, further comprising:
  a network accelerator circuit, arranged to perform hardware-based packet forwarding associated with the at least one packet;
  wherein the Linux kernel running on the processor is further arranged to notify the network accelerator circuit to recycle one or more of the multiple packets when said one or more of the multiple packets are sent out by the packet forwarding apparatus.

13. The packet forwarding apparatus of claim 12, further comprising:
  a second storage device, accessible to a DMA controller and arranged to buffer a plurality of addresses at which the plurality of buffers are allocated in the first storage device;
  wherein when said one or more of the multiple packets are sent out by the packet forwarding apparatus, the network accelerator circuit is further arranged to enqueue an address of each of one or more of the multiple buffers to the second storage device through the DMA controller, where said one or more of the multiple packets are buffered in said one or more of the multiple buffers.

14. The packet forwarding apparatus of claim 9, further comprising:
  a network accelerator circuit, arranged to perform hardware-based packet forwarding associated with the at least one packet; and
  a second storage device, accessible to the Linux kernel running on the processor, wherein the second storage device comprises a transmit (TX) buffer arranged to buffer the multiple packets for packet aggregation;
  wherein the Linux kernel running on the processor is further arranged to notify the network accelerator circuit to recycle one or more of the multiple packets when said one or more of the multiple packets buffered in said one or more of the multiple buffers are copied to the TX buffer.

15. The packet forwarding apparatus of claim 14, further comprising:
  a third storage device, accessible to a DMA controller and arranged to buffer a plurality of addresses at which the plurality of buffers are allocated in the first storage device;
  wherein when said one or more of the multiple packets buffered in said one or more of the multiple buffers are copied to the TX buffer, the network accelerator circuit is further arranged to enqueue an address of each of said one or more of the multiple buffers to the third storage device through the DMA controller.

16. A packet forwarding method comprising:
  buffering at least one packet in at least one buffer allocated in a storage device;
  executing a Linux kernel on a processor to perform software-based packet forwarding associated with the at least one packet; and recycling the at least one buffer allocated in the storage device through direct memory access (DMA) management which enqueues at least one address of the at least one buffer allocated in the first storage device for later reuse of the at least one buffer via DMA, and reusing the at least one buffer for buffering at least one other packet.

17. The packet forwarding method of claim 16, wherein the Linux kernel running on the processor does not allocate at least one new buffer in the storage device during the packet forwarding of the at least one packet.

18. The packet forwarding method of claim 16, wherein the Linux kernel running on the processor does not free the at least one buffer in the storage device during the packet forwarding of the at least one packet.

19. The packet forwarding method of claim 16, further comprising:
   performing hardware-based packet forwarding associated with the at least one packet, comprising:
      notifying the Linux kernel to recycle the at least one packet.

20. The packet forwarding method of claim 16, further comprising:
   performing hardware-based packet forwarding associated with the at least one packet by a network accelerator circuit;
   wherein executing the Linux kernel on the processor to perform the software-based packet forwarding associated with the at least one packet comprises:
      notifying the network accelerator circuit to recycle the at least one packet.

* * * * *